(12) United States Patent
Lacy

(10) Patent No.: US 7,533,116 B2
(45) Date of Patent: May 12, 2009

(54) METHOD AND SYSTEM FOR DISPLAYING FILES TO A USER

(76) Inventor: Donald D. Lacy, 11300 Wilson Rd., Utica, OH (US) 43080

(*) Notice: Subject to any disclaimer, the term of this patent is extended or adjusted under 35 U.S.C. 154(b) by 491 days.

(21) Appl. No.: 10/836,373

(22) Filed: Apr. 30, 2004

(65) Prior Publication Data

US 2005/0246640 A1 Nov. 3, 2005

(51) Int. Cl.
 *G06F 17/30* (2006.01)
(52) U.S. Cl. .................... 707/102; 707/100
(58) Field of Classification Search ............ 707/1, 707/100, 102; 717/174; 715/713
 See application file for complete search history.

(56) References Cited

U.S. PATENT DOCUMENTS 5,675,788 A * 10/1997 Husick et al. ............ 707/104.1
2003/0028610 A1 * 2/2003 Pearson .................... 709/213

OTHER PUBLICATIONS http://www.amicutilities.com/file-locator/ ; File Locator—File Search Tool; including screen shots; pp. 1-5.
http://claysoft.com/vscout/ ; Family Software Products: VScout Visual Graphics & Sound File Locator & Previewer; pp. 1-2.
Scott Dunn, 76 Ways to Get More Out of Windows, Mar. 2004, WWW.PCWORLD.COM, with printout of page showing Figure 1 for paragraph 3 of article.

* cited by examiner

*Primary Examiner*—Cheryl Lewis
(74) *Attorney, Agent, or Firm*—Merchant & Gould P.C.

(57) ABSTRACT

A method and system for displaying files to a user by presenting several lists of files and allowing a user to view metadata about particular files. The lists may be organized according to projects, software applications, or other criteria. To help the user locate the appropriate file, metadata or file property information of one file each list is displayed in a window pane for that list. The order of the files in the list may be rearranged according to properties such as size, date of last modification, etc. To reduce the input required from a user to load files, multiple files can be selected and then loaded into related software applications.

22 Claims, 21 Drawing Sheets

METHOD AND SYSTEM FOR DISPLAYING FILES TO A USER

FIELD OF THE INVENTION

The present method and system relate generally to locating and opening files in a file system and more particularly to methods and systems for allowing a user to more quickly and efficiently locate and load desired files.

BACKGROUND OF THE INVENTION

Files stored in a computer system are typically presented to a user using a hierarchical system of folders. To locate a file, a user performs a series of mouse clicks to navigate through folders or menus. This generally requires the user to know the name of the file and the folder or folders in which the file is located.

In general, there are two basic steps involved in using any application program. The first step is to launch the application program. The second step is to load a file, which can be a new file or an existing file.

Launching an application program can be simplified by making a shortcut icon available on the desktop. It is also possible to create shortcut icons for particular files. However, there is a limited amount of space for icons on the desktop and no more than a few dozen files can be presented and organized there. Many users have hundreds or thousands of files. It is impractical to use shortcuts to organize this volume of files.

Returning to the two-step process previously described, operating systems typically allow a user to open an application by navigating through a series of menus. For example, in the WINDOWS® operating system, one way to open an application is to first click on "Start." This brings up a list that includes the word "Program." Moving the mouse over the word "Program" pops up another menu that lists a series of programs or program folders. Sliding the mouse over to this list and clicking the mouse button activates an application program or pops up additional menus. Opening an application requires at least three inputs by the user through a mouse or keyboard.

Once an application is launched, the user must still identify and locate the particular file which the user desires to open. Typically, the user may locate a file by activating one or menus in the application program and then navigating a series of folders. For example, in some applications, the first step is to click on the "File" button, which pops up a menu. In this menu there is a list of names of a few files that were most recently used. If the user wants to view one of these files, the user can click on the appropriate file name in the list. Frequently, however, the desired file will not be in the list. If the file is not in the list, the user typically clicks on a button to access the file system and then executes several more mouse clicks to navigate menus and folders to reach a desired file folder and ultimately a desired file. If the user does not know the location of the file, the user may be required to search through the file system, which entails many more mouse clicks, to locate the desired file. The user can also use a search tool to search the file system for files with particular file names or other attributes. Again, this requires many inputs from the user, undermining efficiency.

A user can also access the file system directly using a file manager program to view the hierarchical display of filenames. Again, many clicks are required to navigate through folders until the desired file is found, assuming the user even knows where to locate the file.

Improvements are needed to methods and systems for assisting users in locating files.

SUMMARY OF THE INVENTION

A method for displaying files to a user includes populating a database with information about the files contained in a file system, selecting a first subset of the files according to a first criteria and selecting a second subset of the files according to a second criteria. A user interface is presented that is divided into at least first and second sections. Each section includes a list region and a property region. The list region presents a list of files that includes at least a portion of one of the respective first and second subsets of files in the database. The files in the list are arranged according to an ordering criteria. The property region presents information regarding the properties of a file in the list. A launch and load input is received from a user selecting a file for loading. The launch and load input may be a single mouse input, e.g. a single click of a mouse button. In response to the launch and load input, an application that is associated with the file selected for loading is launched and the selected file is loaded in the application.

A file-select input may also be received from a user. In response to the file-select input, information about properties of the file selected by the user is presented in the property region of the section for the list from which the file was selected. An organization input may also be received from a user. In response to the organization input, the files in the list are reorganized. A view-additional-file input may also be received from a user. In response to the view additional file input, additional files in the subset are presented as requested by the user.

In another embodiment, a method of displaying files in a computer system includes populating a database with information about the files contained in a file system, selecting a first subset of the files according to a first criteria, selecting a second subset of the files according to a second criteria, and presenting a user interface. The user interface is divided into at least first and second sections. Each section includes a list region for presenting a list of files including at least a portion of one of the first and second subsets of files in the database, the files in the list being arranged according to an ordering criterion; and a property region for presenting information regarding the properties of a file in the list. The method may further include receiving an organization input from a user selecting an organizational criteria for reorganizing the files in the list, and, in response to the organization input, reorganizing the files in the list. The method may also further include receiving a file-select input from a user selecting a file from one of the lists; and, in response to the file-select input, presenting information about properties of the file selected by the user in the property region of the section for the list from which the file was selected and receiving a view-additional-files input from a user requesting to view additional files in one of the subsets; and, in response to the view-additional-file input, presenting additional files in the subset as requested by the user; and receiving a launch and load input from a user selecting a file for loading, the launch and load input consisting of a single mouse input from a user. In response to the launch and load input, an application is launched that is associated with the file selected for loading; the selected file is loaded in the application; and the user interface is hidden.

The user interface may further include a multi-select button on the user interface that initiates a multi-select mode. In the multi-select mode, if the multi-select button is activated by a user, an input from a user is received. The input selects at least one file from the list in the first section. A second input from a user may also be received. The second input selects at least one file from the list in the second section. If the multi-select button is activated again by a user, the file from the list in the first section is loaded into an application and the file selected from the list in the second section is loaded into an application. The selected files may be associated with different applications. The different applications are launched and the selected files are loaded into corresponding applications without additional input from the user.

The user interface further may also include a button that if selected doubles the amount of lateral screen space available to present information about the properties of the file selected by the user so that additional information can be presented as necessary. A button may also be provide that if selected launches an application without loading a data file.

The files in the list may be selectively ordered according to at least one of the following organizational schemes: by alphabetical order of the names of the files or reverse alphabetical order; by chronological or reverse-chronological order based on the creation date of the files; by chronological or reverse-chronological order based on the date the files were last modified; and by size.

An input may also be received to print, cut, copy, delete, or rename a file. In response to the input, the file is printed, cut, copied, deleted or renamed as requested.

In another embodiment, a method for displaying files in a computer system includes presenting a user interface including a first list of files and a second list of files, the files in the first and second lists each being associated with at least one software application. The user interface further includes a multi-select button that is configured to initiate a multi-select mode. In the multi-select mode, if the multi-select button is activated by a user, inputs from a user are received to select at least one file from each of the first and second lists. If the multi-select button is activated again by a user, the software application or applications that are associated with the selected files are launched and the selected files are loaded into their respective associated software applications.

In another embodiment, a method of displaying files in a computer system includes receiving a first input from a user designating a first software application; receiving a second input from a user designating a second software application; populating a database with information about files in a file system that relate to the first application or the second application; and presenting a user interface. The user interface includes a first list of files including at least a portion of the files in the file system that relate to the first software application; and a second list of files including at least a portion of the files in the file system that relate to the second software application, the second list of files being positioned on the user interface adjacent to and aligned with the first list of files. The user interface further includes respective first and second sets of information about the properties of respective selected files in the list of files, the information being positioned on the user interface above the respective list of files and being arranged in a series of rows. The information includes at least two of: the size of the first selected file; the date on which the first selected file was last accessed; the date on which the first selected file was last created; and the date on which the first selected file was last modified. A user can access a particular file by locating the particular file in the first list or second list and enter an input to select the particular file.

DETAILED DESCRIPTION OF THE PREFERRED EMBODIMENT

A file selector program may assist a user who has 'lost' a file or cannot remember the name of a file or folder you can't find. Typically, the conventional hierarchy "tree" presentation of filenames results in the distribution of files and folders down through many levels of hierarchy. The user typically needs to identity and access what is at the end of the branches-filenames. Starting at the root each time and navigating through many branches can involve a 'hunt and guess' process much of the time. Embodiments of the present file selector program allow a user to start from the edge of the tree in the first place—the filenames—and then automatically launch an application that can load the selected filename.

In general, a file selector program provides a user with information about data files or folders and allows the user to launch a file and application. The file selector program displays filenames grouped together according to parameters that are useful to the user, such as application type. Files in particular folders and subfolders can all be displayed together to reduce the burden of navigation through a file system. By eliminating irrelevant files from consideration, the user's job of locating desired files is made easier. The user can also select multiple files and then open those files with a single input—preferably a click of the mouse.

Figure 1:
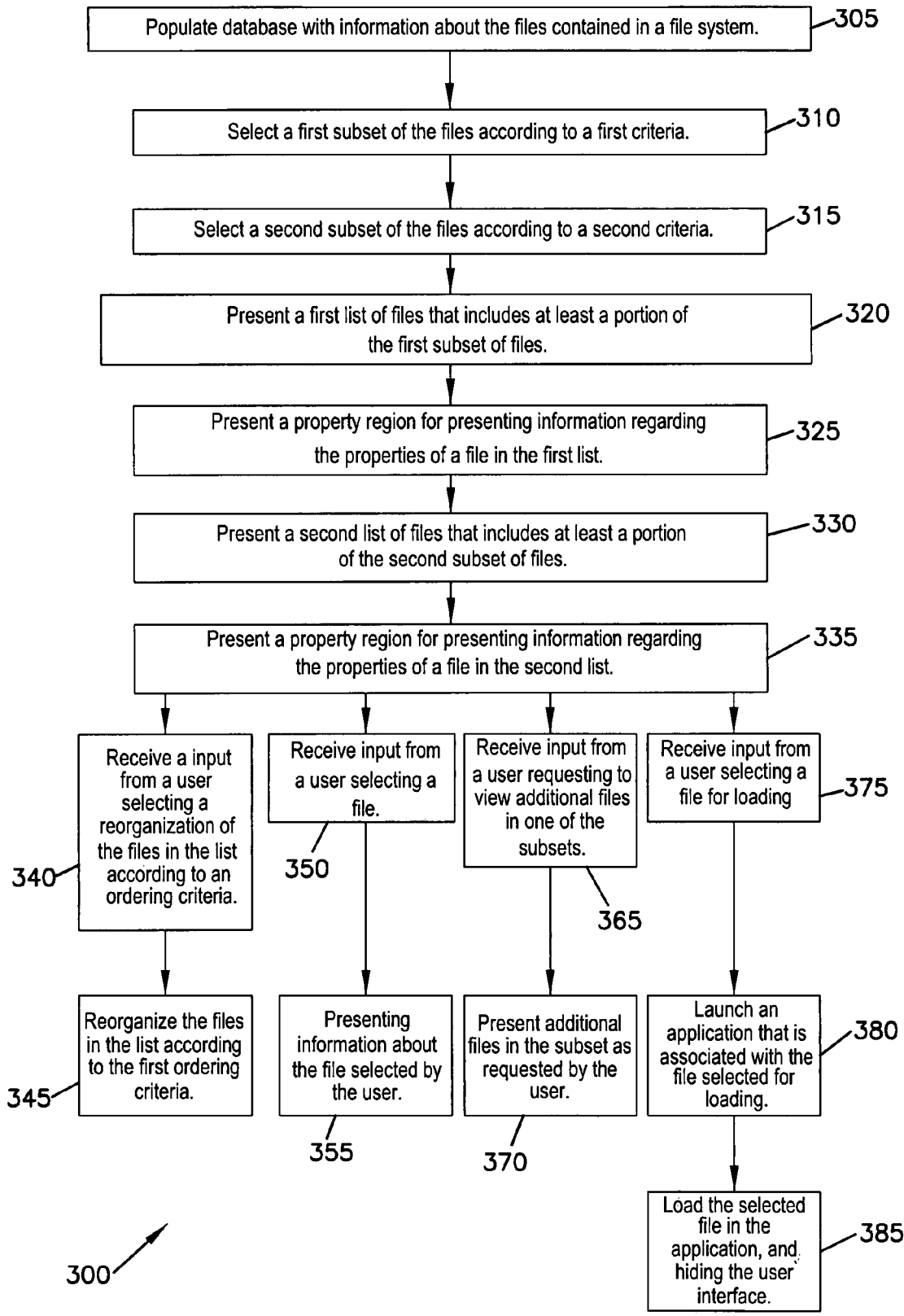
FIG. 1 depicts a method for displaying files in a files system.

FIG. 1 illustrates one embodiment of a program 300 for displaying files to a user. For purposes of explanation the term "file" is used to indicate the filename that is presented to a user to indicate a link to the data in a particular file.

Populate database module 305 populates a database with information about the files that are contained in a file system. The files may be stored on any storage device, including local file storage devices or networked storage devices. Local storage devices include but are not limited to a hard drive, a CD, a DVD, a floppy disc, and a portable storage device such a USB flash drive. Networked devices included the above-listed devices when made accessible through a network, including for example hard drives accessible through a local network as well as storage devices accessible through the internet.

First subset select module 310 selects a first subset of files according to first criteria. The first criteria may for example be the location of the organization of the files in an operating system (e.g. in a particular folder), the association of the files with a particular software application. Other criteria are possible. Combinations of criteria are possible (e.g. files in a particular folder or subfolders that are associated with a particular application). Second subset select module 315 selects a second subset of files according to a second criterion. The second criterion is not necessarily different from the first criteria, but typically the criteria are different so that the subsets contain different files.

Figure 4:
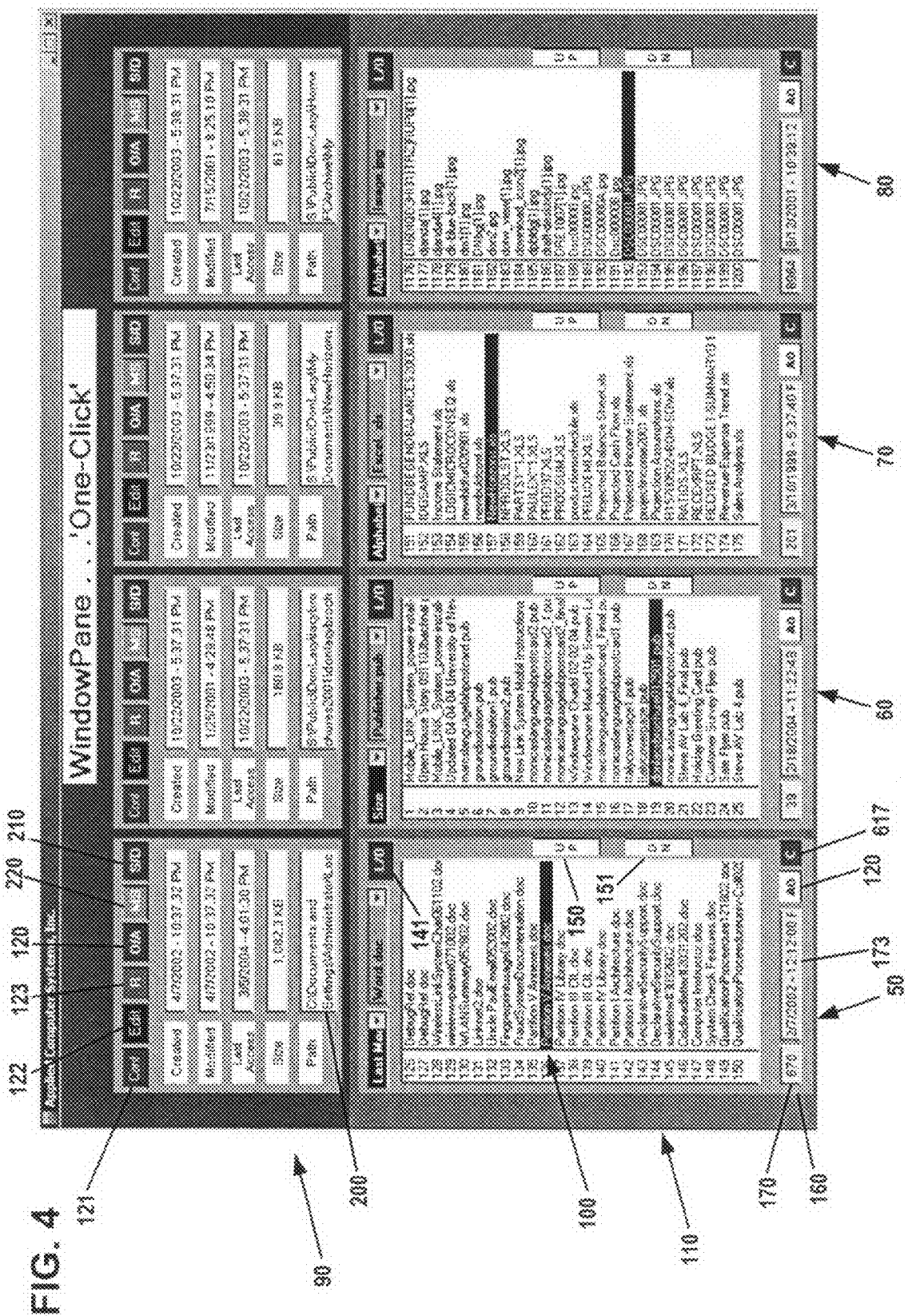
FIG. 4 shows a user interface for a program for file selection program.

Present files module 320 displays a list of files in the first subset. In the preferred embodiment, a predetermined number of files in the subset are displayed. FIG. 4 for example shows 25 files being displayed.

Property module 325 displays information about the properties of a file in the first list. The property information may for example include file size, creation date or last modification date.

Present files module 330 displays a list of files in the second subset. Property module 335 displays information about the properties of a file in the second list.

Select organization module 335 allows the user to provide input to selectively reorganize the files in one of the lists according to an ordering criterion, such as by creation date, alphanumeric sequence, or modification date. Reorganize module 340 causes the files to be presented in a new sequence according to the ordering criterion selected by the user.

Select file module 350 allows a user to select a file, for example by moving the mouse over the file in the list or alternatively by clicking on the file or by using arrow keys on a keyboard. Present property information module 355 causes information about the properties of the selected file to be displayed.

View additional file module 365 allows a user to provide an input indicating a request to view additional files. The input may for example be by using a mouse to select an up or down arrow to proceed upward or downward in the list of files. Show additional files module 370 displays additional files as requested by the user.

Select launch and load module 375 allows a user to provide an input to select a file for loading. Launch module 380 launches an application that is associated with the file selected by the user. Load module 385 loads the selected file into the application and automatically hides the user interface for the program 300.

Figure 2:
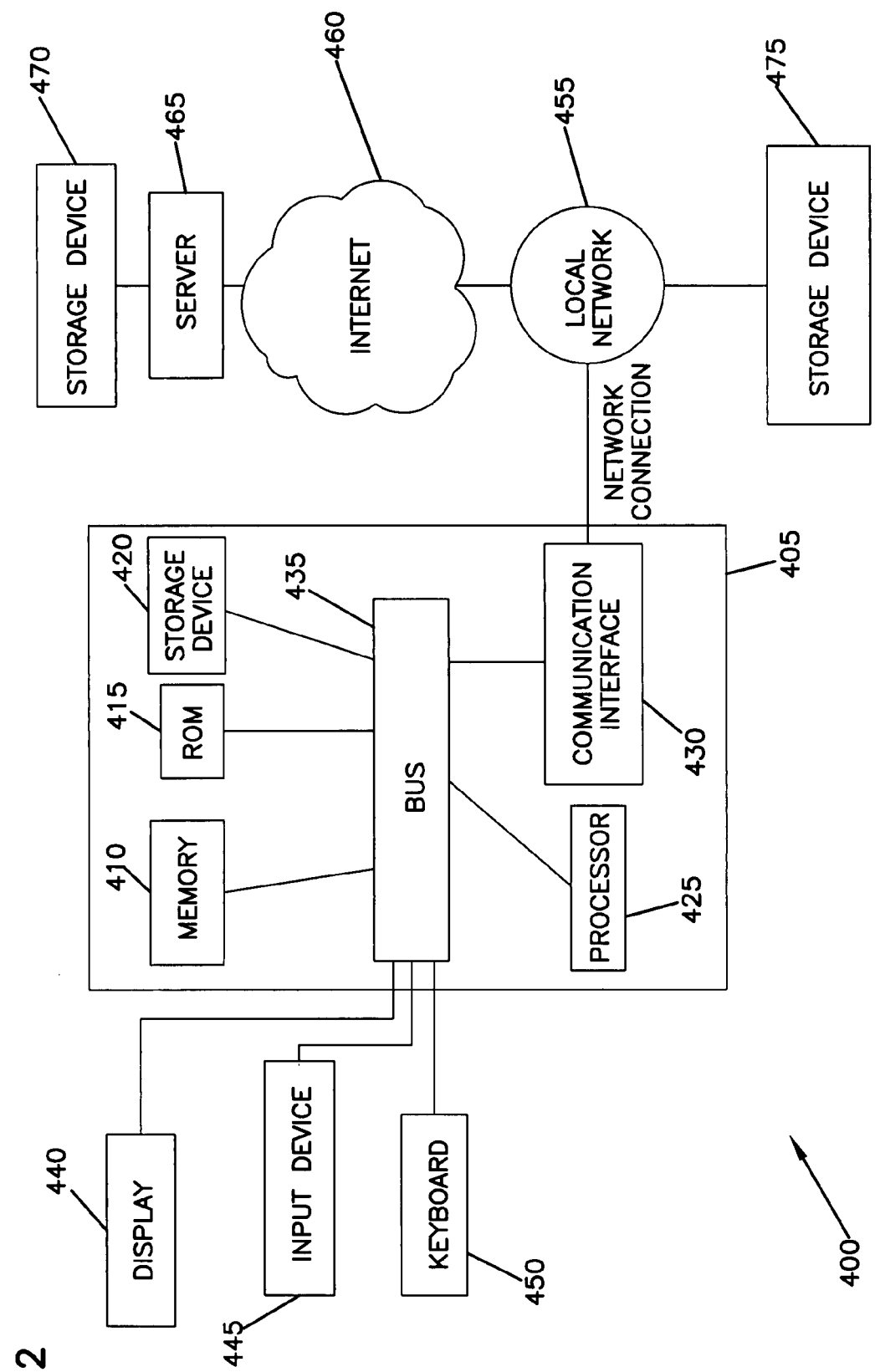
FIG. 2 shows a computer system.

FIG. 2 shows a typical computing environment 400. The program for running files may be run on a computer system 405 using any operating system, including but not limited to LINUX, MACINTOSH platforms, and WINDOWS platforms including WINDOWS XP, CE and others. The computer system 405 includes a memory system 410, a ROM unit 415, a storage device 420, a processor 425, a communication interface 430, and a bus 435 that connects the various components. The computer system 405 is linked to a display device 440, an input device 450 such as a mouse, trackball, or pen, and a keyboard 445. A communication interface 430 in the computer system links the computer system to a local network 455 which may include a storage device 475. The local network may be connected to other computers through a network such as the Internet 460. A remote server 465 and remote storage device 470 may be accessed through the Internet.

The program 300 may show files on any storage device that is accessible through the computer system 405, including for example the storage device 475 on a local network and the storage device 470 that is accessed through the Internet, in addition to the storage device 420 that is integrated into the computer system.

Figure 8:
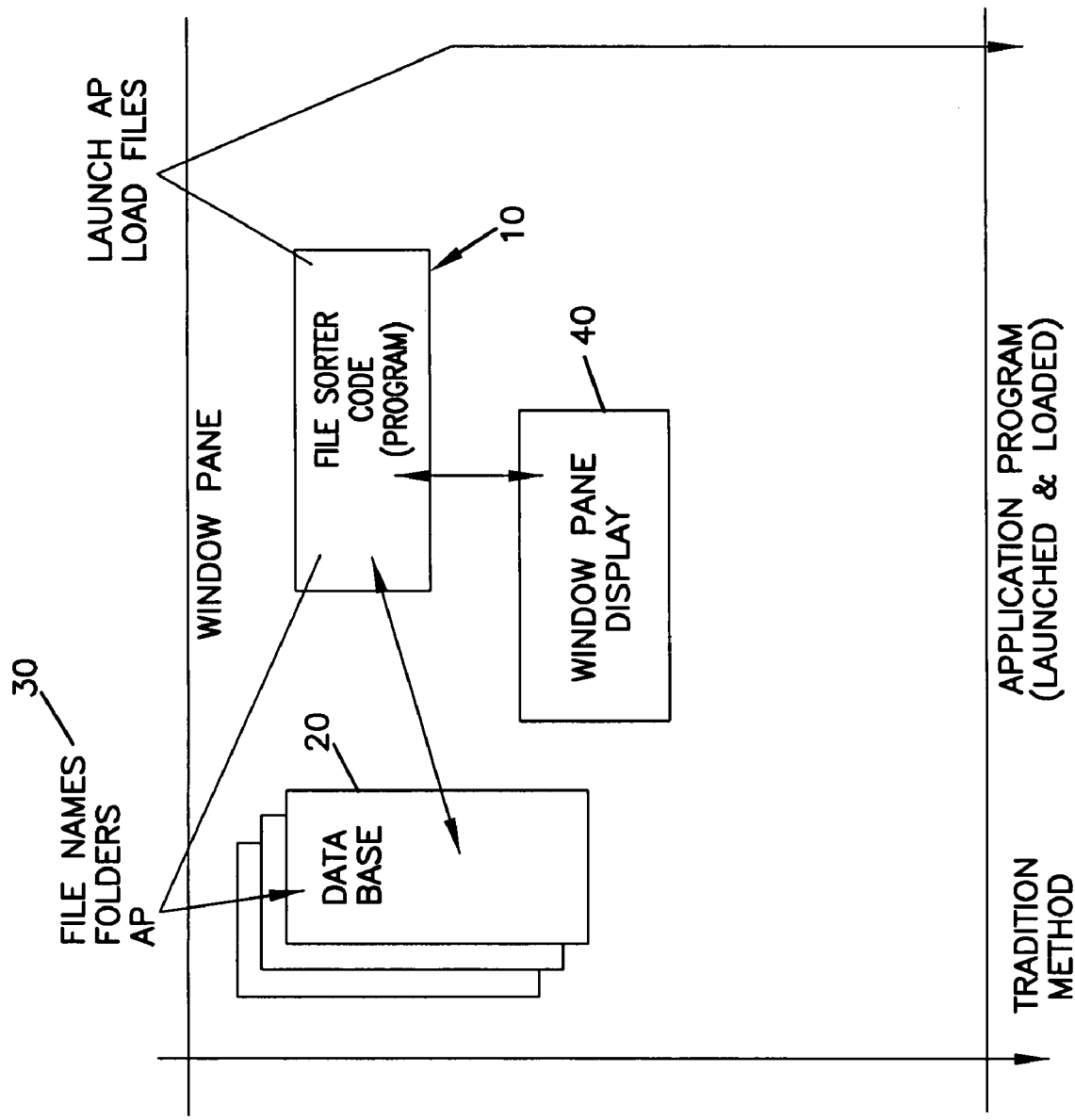
FIG. 8 is a schematic illustration of the relationship of an embodiment of the present invention to an operating system and an application program.

As shown in FIG. 8, the file selector program operates between the file system and any application programs. The program is designed to make it easier for the user to access files in the file system. In the preferred embodiment, the user only has to interact with one screen shown in FIG. 4 and does not need to navigate through multiple folders as well as multiple applications. When the file selector system 10 is installed, it populates a database 20 with information about the files in the file system 30. When a user wants to access a file, the user can work through a file selector interface 40 instead of navigating the file system 30.

The file selector interface presents information in an accessible manner and allows files and applications to be opened with a single click or at least far fewer clicks than would be necessary if the user navigated through the file system. When the user selects a file from the file selector user interface, the file selector program launches the appropriate application and opens the selected file. In the preferred embodiment, an application may be launched and a file loaded into the application all with a single click. When a new file is created, the file selector program adds information about that file to the database 20.

Figure 3:
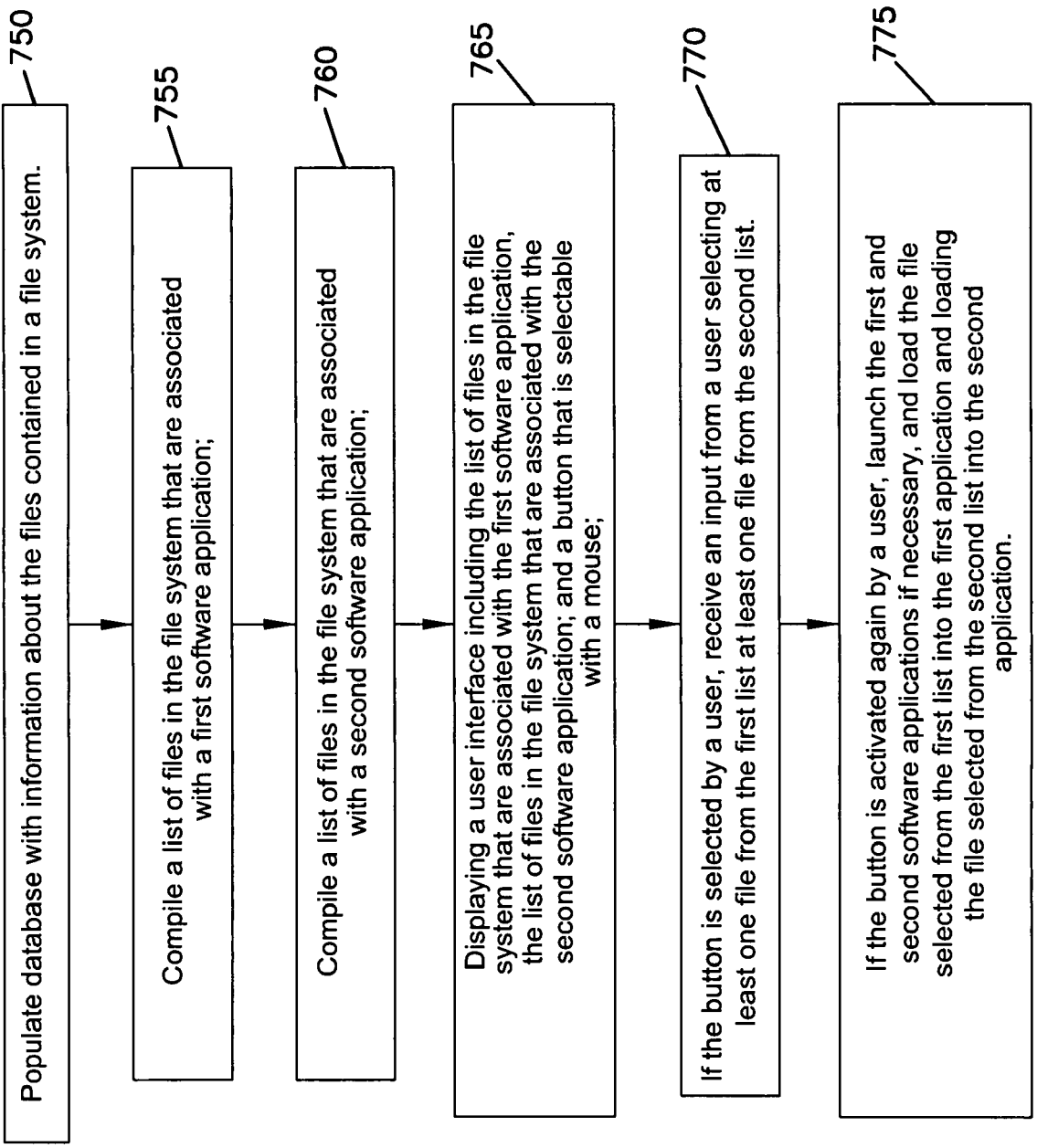
FIG. 3 depicts a method for launching and loading multiple files.

FIG. 3 depicts a program for loading multiple files into one or more software applications. Populate database module 750 populates a database with information about the files stored in one or more storage devices. Compile list modules 755 and 760 compile a respective lists of files that are associated with respective first and second software applications. User interface module 765 presents a user interface that shows the lists of files and presents a button. If the button is selected, file select module 770 allows a user to select files from the list. If the button is selected again, the launch and load module 775 launches first and second applications. In some instances an application may already be running, in which case a launch may be unnecessary. Launch and load module 775 also loads the selected files into their respective associated applications.

The file selector program generally enables the user to perform processes faster than the "traditional method" of using an application program to navigate through a file system. This is in part because the file selector program reduces the number of mouse clicks or other inputs required from the user, which results in saved time.

As shown in the figures, the file selector program alleviates the task of navigating through file systems to search for particular files: The file selector program locates the files in the various folders throughout the system and displays them to the user for the user to select. This eliminates the inefficiency of navigating down the path to desired files or, worse, searching through the file system for lost files. The file selector makes all the files meeting specified criteria available in one list, including files in subfolders. The files in the list may be sorted based on a variety of criteria including for example, file size, date modified, creation date, file name (alphabetically) or other criteria. The user interface can also be selectively set to search for files, for file folders, or both.

The information in the lists may be presented in a variety of fashions. For example, while Applicant prefers a single list of names, other formats could be used, such as groupings of icons, multiple-column lists, or other schemes, as long as the searching and navigating of a file system is substantially reduced or eliminated to enhance user efficiencies.

In one embodiment, the information presented in the list may be reorganized or changed by making menu selections, or by pressing an appropriate key on a keyboard. In one embodiment, pressing a key cause the program to present a filename having characteristics relating to that key. For example, if the filenames are presented in the order they were last accessed, pressing a letter key brings up the first filename in the list that starts with that letter. Pressing "D" for example will find the first file in the list that begins with "D" and place it at the top of the list. Pressing "D" again finds the next filename that begins with D. In the preferred embodiment, the program works in the same manner for any organizational scheme. Keys or combinations of keys may also be designated to access files having other particular characteristics. In one embodiment, this keyboard-functionality is present only when the selector arrow is positioned over the list.

When the filenames and/or folders are arranged alphabetically, pressing "L" would present the first file or folder with a name beginning with the letter L at the top of the list of files or folders. In an alternate embodiment, pressing a letter on the keyboard both reorganizes the list according a particular scheme and moves to a particular place in the list. For example, in this embodiment, pressing the L key causes the files and/or folders to be alphabetized and presents the files beginning with the letter L.

Figure 5:
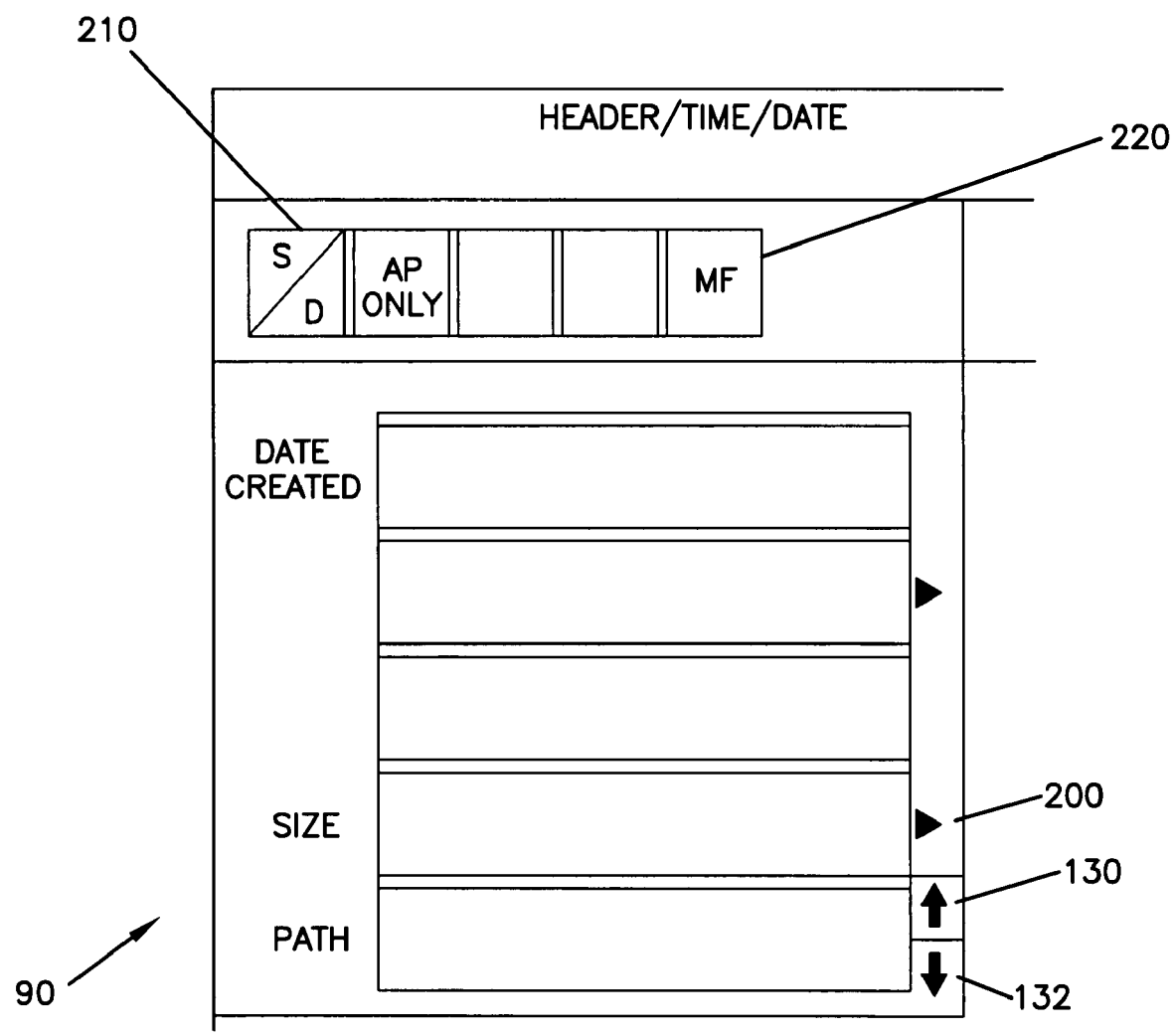
FIG. 5 shows a top window of a user interface for a file selector program.
Figure 6:
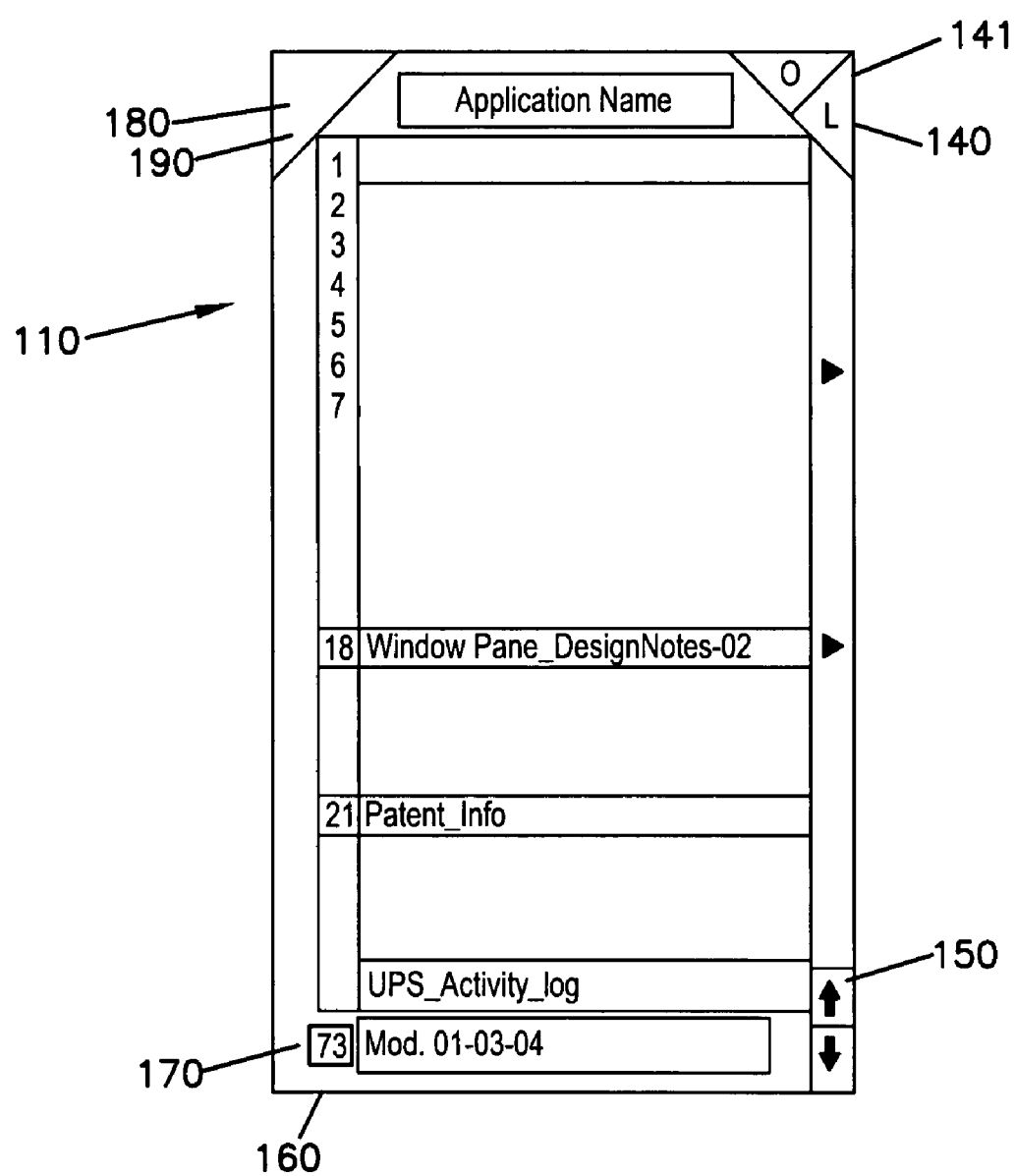
FIG. 6 shows a lower window for a file selector program.

Referring again to FIG. 4, a preferred embodiment of the file selector program has a user interface that is split into four sections 50, 60, 70, 80. FIG. 5 shows an upper region 90 of a section and FIG. 6 shows a lower region 110 of a section. Each of the four sections of the user interface operates in the same manner. In FIG. 4 the four sections are arranged side-by-side. For illustration purposes, the sections correspond to four applications: WORD®, EXCEL, PUBLISHER AND IMAGE.

The program can alternatively present more than four sections, or less, depending on the system configuration and other factors. For example, a higher-resolution display can accommodate more sections and can accommodate a longer list of filenames in each section. A display having 1280×1024, for example, can accommodate five windows whereas four windows of equivalent resolution would fit on a 1024×768 display.

Figure 7:
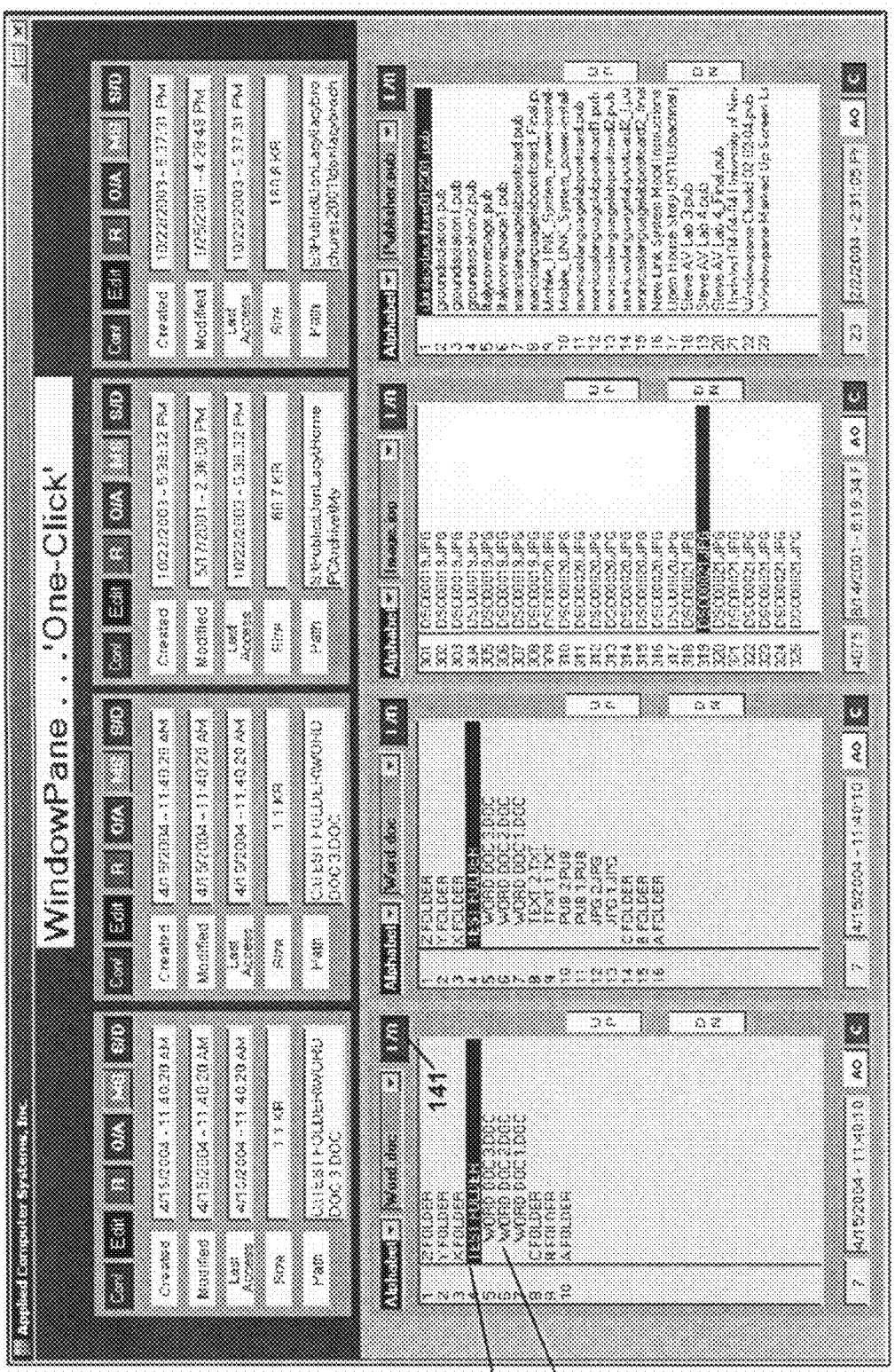
FIG. 7 shows a user interface showing folders and filenames from various applications.

In another embodiment, the sections correspond to user-defined projects instead of software applications. For example, the four sections may be labeled "Project A", "Project B", "Project C", and "Project D". The program compiles lists of files that relate to each project and presents the files in the lists in the corresponding section of the user interface. In one embodiment, this is accomplished by reference to a folder and subfolder representation of files that are stored in one or more file storage devices. A folder or subfolder may be selected by selecting a Config button to bring up a configure menu or utility. The user is asked to designate one or more folders that contain files that relate to a particular project. The system then scans those folders to gather information about the file located in those folders. One skilled in the art will understand that files are not physically stored according to folders and subfolders, but that files are presented in a folder-subfolder organizational scheme, as is commonly done in operating systems such as WINDOWS®. The system may present only filenames, only folder names, or a mixture of filenames and folder names, as shown in FIG. 7 Filenames are preferably presented with the extension (e.g. .doc or .xls) but could also be presented with out the extension to conserve screen space or for other reasons.

In one embodiment, the program associates with a particular application. In a preferred embodiment, the program associates with an application that is running when the program is launched. For example, if a user is running MICROSOFT WORD® when the program is launched, the program may maintain an association with WORD for interaction with selected documents. For example, if a section of the program interface is to present photo files or image files, such as JPEG files, a paste function is provided in the program to allow interaction with the associated application. For example, selection of a JPEG-type filename will cause the JPEG picture to be inserted into the associated application (i.e. an open WORD® document). In a preferred embodiment, a single click inserts the picture into the document. The paste function may also be employed with other file types.

Figure 18:
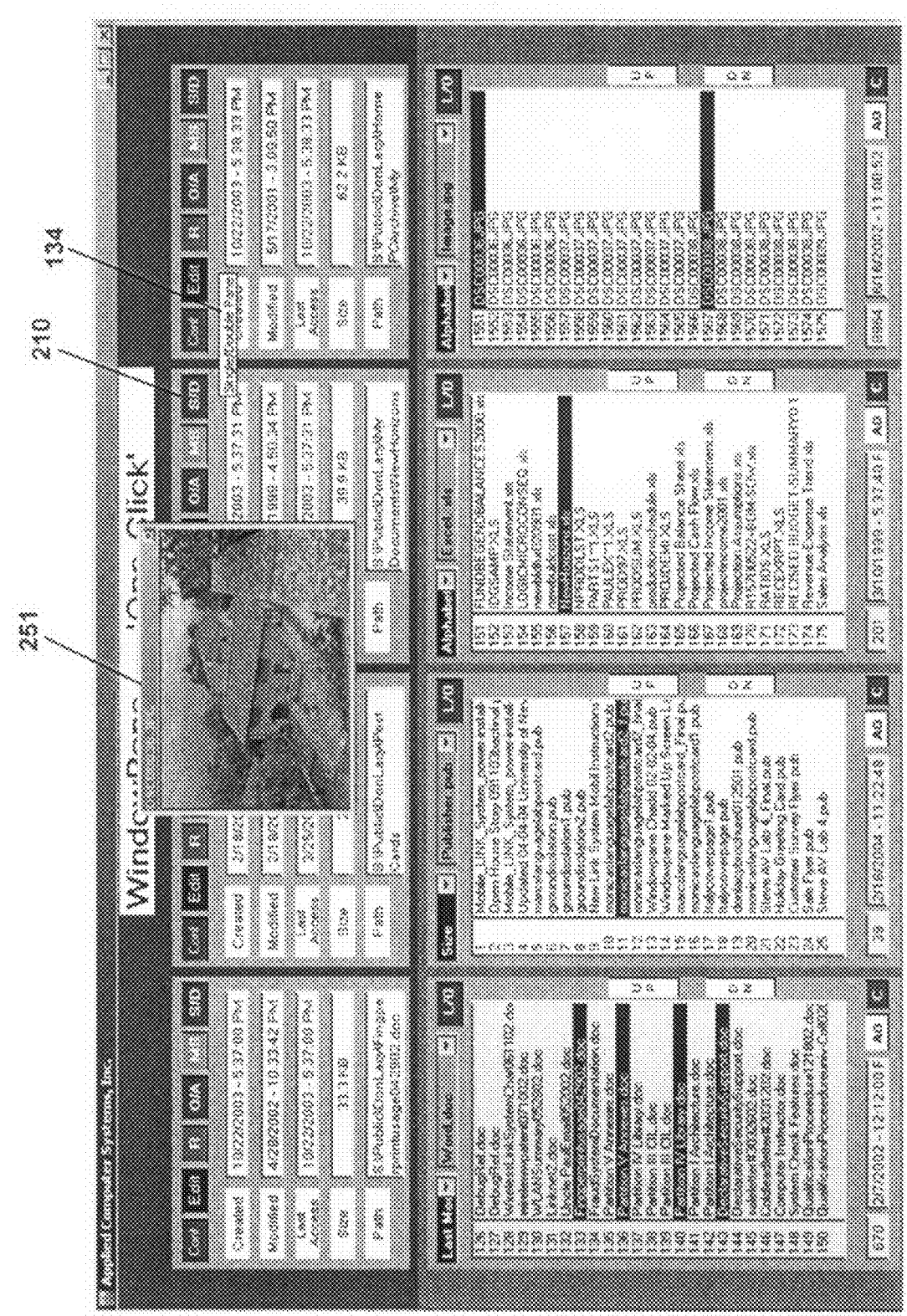
FIG. 18 shows a user interface with a message box near a Single/Double Pane (S/D) button and a preview pane showing a preview image of the contents of a file.
Figure 20:
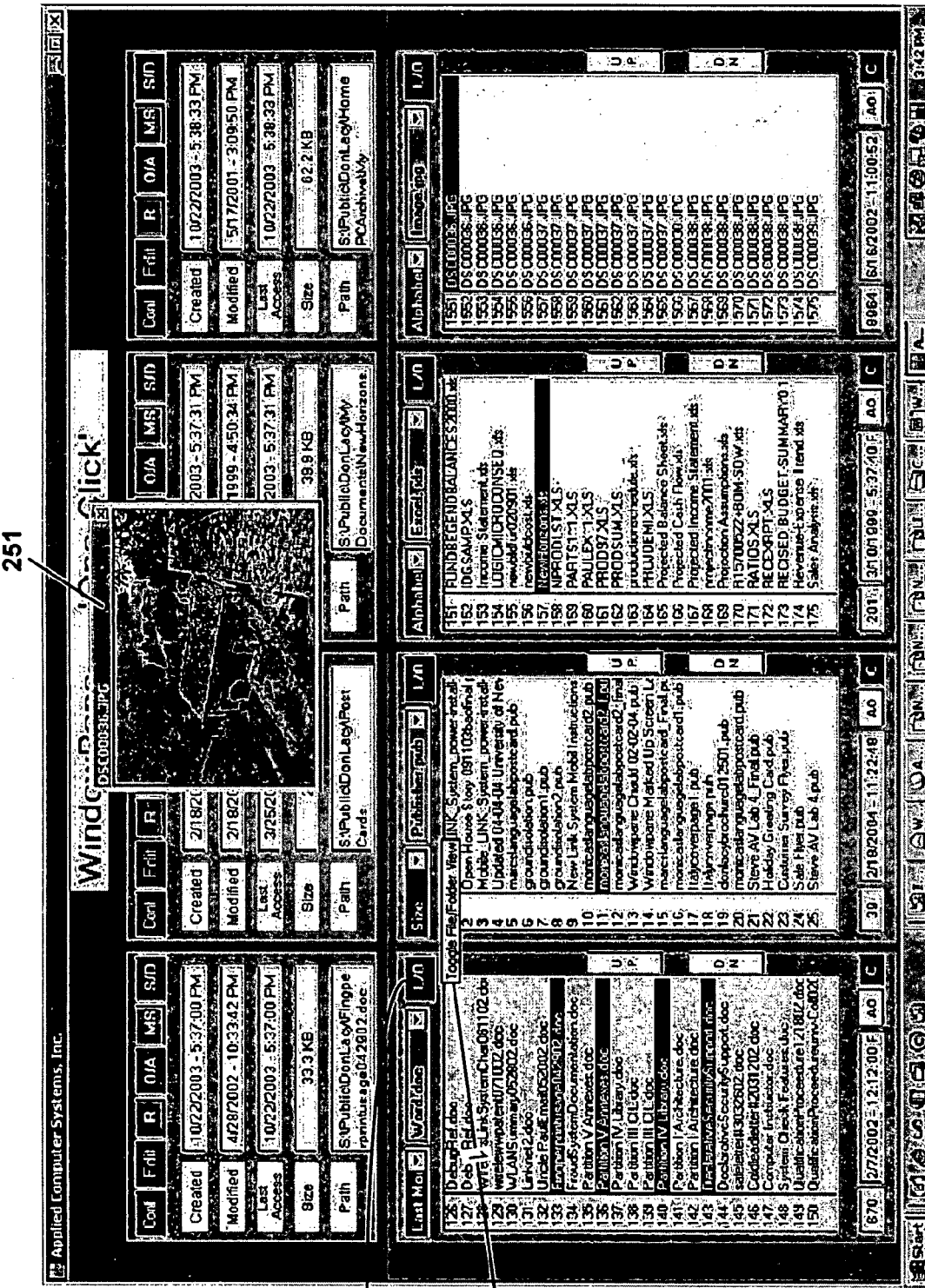
FIG. 20 shows a user interface being used beneath a default-size preview pane of a JPEG image.
Figure 21:
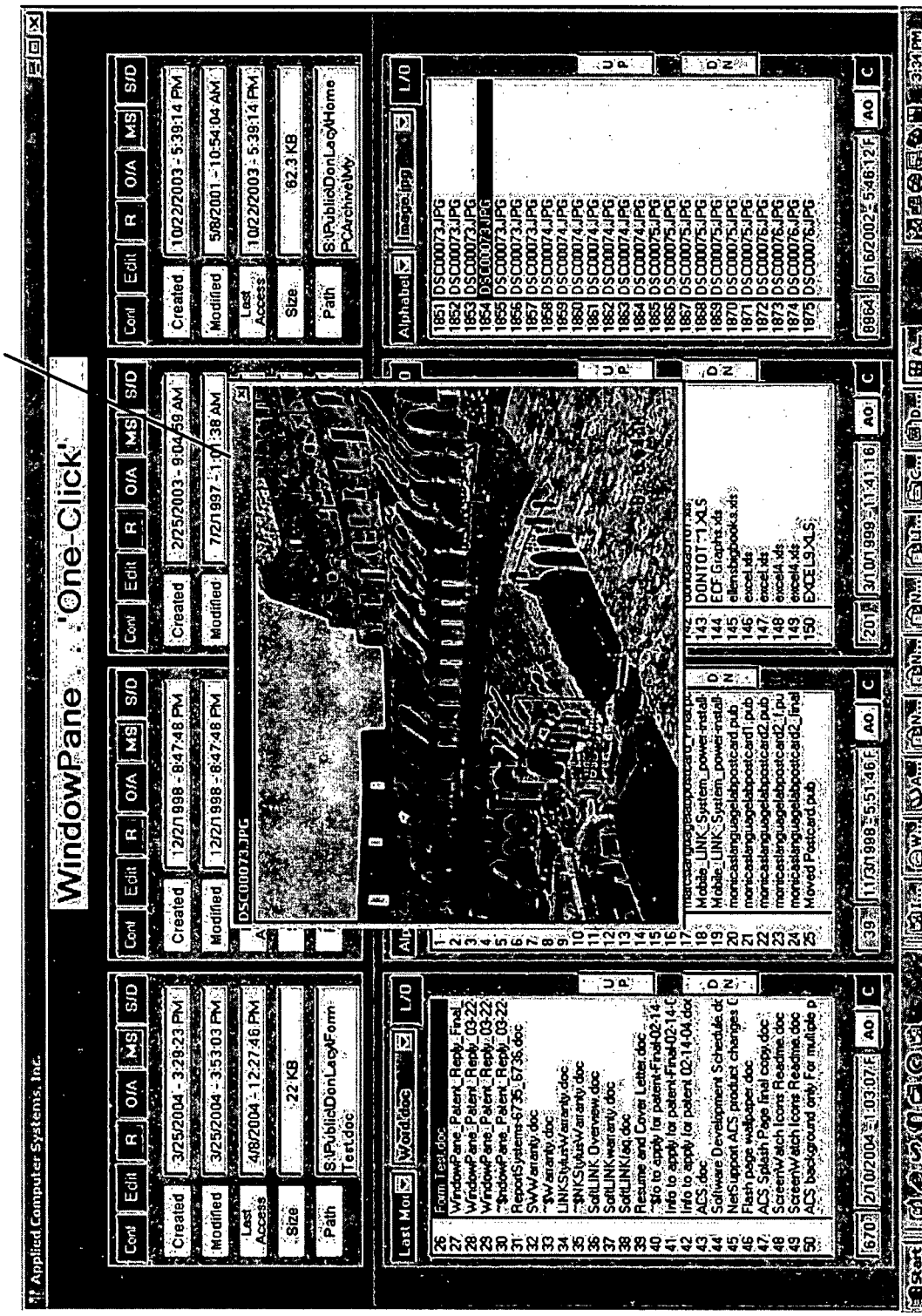
FIG. 21 shows a user interface with a JPEG image that has been stretched to a larger size than the default size shown in FIG. 20.

In one embodiment, the program allows the user to preview a file without loading it into a full application. The preview function permits files to be accessed very quickly and allows the user to view the file to assess whether it is the file the user is looking for and. In a preferred embodiment, a double click activates a preview window 251 to allow the user to view the contents of the file. FIGS. 18, 20, and 21 show a preview pane with a preview of a JPEG file. Other file types, including WORD® files, can also be previewed. The preview window may be a relatively small window or may be alternatively be a large window or even a full screen preview. Preferably a relatively small window is used as the default with other sizes selectively available to the user. In the preferred embodiment, any keystroke or mouse click causes the preview window to revert from a full screen window to a smaller window. This selection and preview process promotes efficiency and limits keystrokes needed to preview and insert images. FIGS. 18 and 20 show a default-sized window. FIG. 21 shows a window that has been stretched by selecting a corner of the window and using the mouse to drag the corner, thereby adjusting the size. In one embodiment, the file selector program is active beneath the preview window 251 as shown in FIG. 20, where a message box 134 for a toggle button 141 is shown on the interface in response to a mouse input.

Referring to FIGS. 4, 5, and 6, the upper region 90 of each section includes information about a selected file 100 from the lower region 110 of that part of the user interface. FIG. 4 shows that the upper portion of the left-most section of the user interface shows the name of the file (Nick Smith Letter-.doc), followed by the size of the file (67.8 kb), the date it was last accessed (01-03-04), the date it was created (01-03-04), the date it was last modified (01-22-04), and the path to the file on the file system. By default, the upper region 90 displays attributes about the folder or file name displayed in the No. 1 slot in the lower portion.

In one embodiment, when the mouse is moved over other file names or folders to select a particular file or folder, the information for that file name or folder is displayed in the upper region. In another embodiment, clicking on a file name causes the display in the upper region of information relating to the selected file. In yet another embodiment, the numbers next to the filenames, shown in FIG. 6, are used to control the information displayed in the upper section. When one of the numbers is selected with a mouse, the filename associated with the selected number is highlighted, and the metadata for that file is displayed in the other sections. The user may then use buttons in the upper region 90 to access additional metadata. In one embodiment, selecting the number locks the program in a mode where the user can investigate the metadata for a file. Selecting the number adjacent the filename a second time removes the highlighting and unlocks the program to return to normal operation of the program. Alternatively, selecting any portion of the lower region releases the highlighting and allows the user to proceed.

Information other than that listed above may be shown, including but not limited to security information such as permission status for individuals or classes of individuals (e.g. full control, modify, read and execute, write, special permissions, delete, or other permissions), custom information such as whether an item has been checked, the name of an associated client, a department or division assignment, or user-defined summary information such as a title, subject, author, category, keyword, comment, word count, character count, line count, paragraph count, template or other information. The user may be permitted to select which information is displayed in the upper region for a project, application, or file.

In one embodiment, executing a right-click with the mouse brings up a menu of tasks that can be executed for a selected file. The menu may include print, scan for viruses, open with (to open a file with an application selected from a list), send to (to send the file as an email or email attachment), cut, copy, create shortcut, delete, rename properties (to bring up a window that shows properties), or other tasks. This allows for manipulation of the files through the interface.

Figure 15:
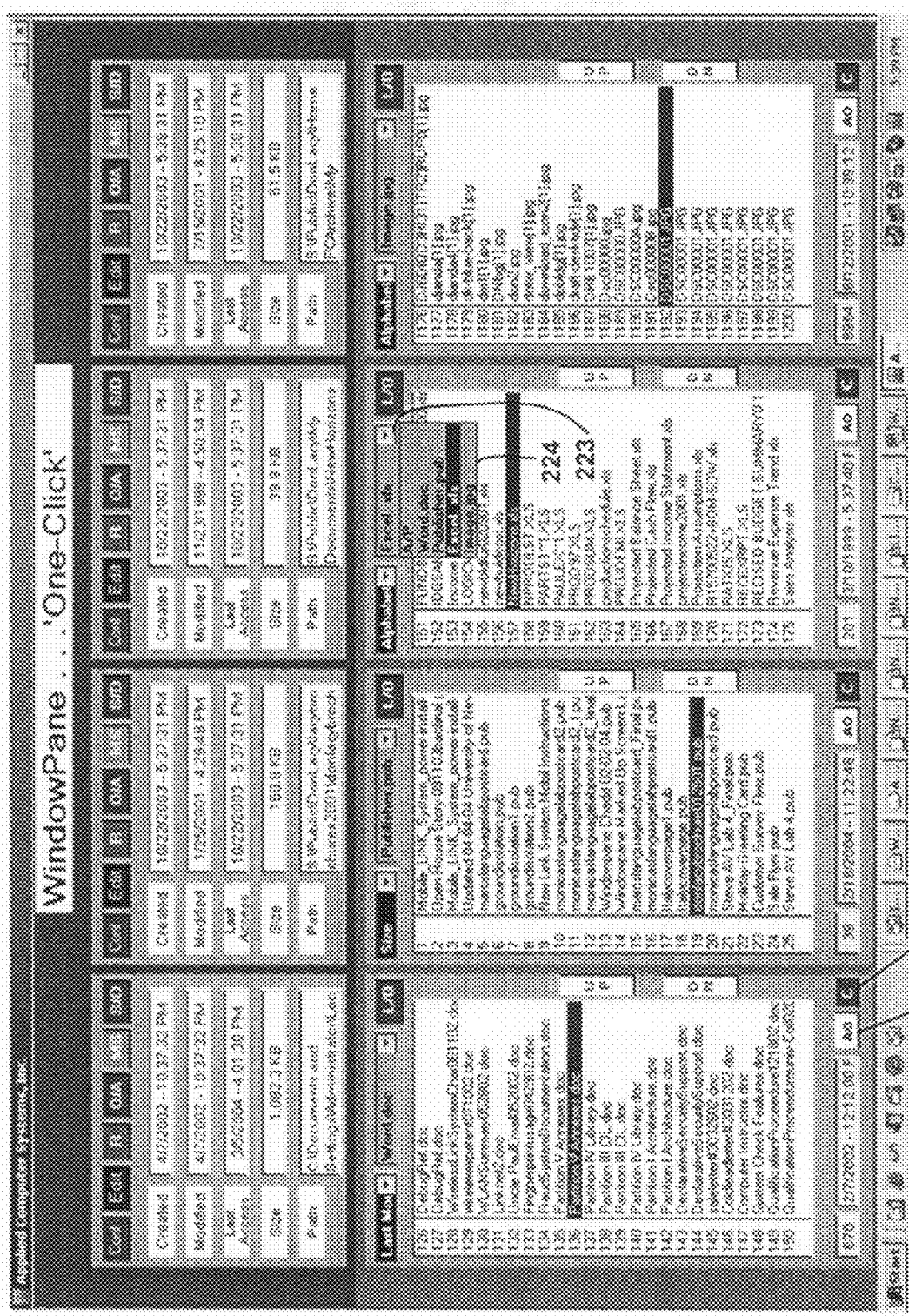
FIG. 15 shows a user interface with a menu selected for choosing a file type.

There are a number of buttons in the upper portion that are used for various functions. The button 120 labeled "AP" or "AO", when selected, will launch the application program only. For example, the "AP" button on the left-most part of the user interface of FIG. 4 would open Microsoft WORD®® but would not open any document file into WORD®®. This may be desirable for example when a user is creating a new document or file name. In FIG. 15, the application only button 120 is labeled "AO" and is located near the bottom of the interface.

There are also "Up" and "Down" buttons 130 along the side of the upper region 90. Clicking on these buttons will display more attributes of the folder or file that is highlighted. The Up and Down buttons could be a single toggle button or two separate buttons respectively dedicated to Up (present more information) and Down (present less information.)

In a preferred embodiment, the program provides message boxes 134 for each of control buttons. The message boxes automatically appear when the mouse pointer is positioned above any button. After the user has become familiar with the program, he or she might not want to see the descriptive aids provided with the message box. The program preferably includes an option that the user can select within the Config Button to control whether messages are displayed.

In one embodiment, executing a right-click with the mouse brings up a menu of tasks that can be executed for a selected file. The menu may include print, scan for viruses, open with (to open a file with an application selected from a list), send to (to send the file as an email or email attachment), cut, copy, create shortcut, delete, rename properties (to bring up a window that shows properties), or other tasks. This allows for manipulation of the files through the interface. In another embodiment, this menu may be accessed using an Edit button 122.

In one embodiment, shown in FIG. 4, the lower region 110 displays up to 25 folders O or file names L at one time. In the upper right-hand corner 140 of the lower portion, there is a button 141 that toggles between the letter "L" and the letter "O". Alternate clicks on this toggle command display either folders (O) or file names (L). In one embodiment, the button may be configured as a "rotating" button. If the program is operating in the file view mode, the button shows an "O". If a users selects the button, the program switches to folder-view mode, and the button shows an "L". In one embodiment, the button rotates when selected to switch from O to L or vice-versa.

FIG. 7 shows the first two windows toggled to folder view. As shown in FIG. 7, a combination of folders 142 and filenames 143 may be shown. There are also "Up" and "Down" buttons 150, 151 along the side of the window to display 25 additional or previous folder or file names. The arrow keys on the keyboard can also be used to move through the files. In the lower left corner 160 there is a count number 170 that indicates the number of files available for viewing. A field 173 indicates the date of modification of the file shown in the last position on the list. In the upper left corner 180, there is a button 187 that is used to select an organizational scheme. The button is preferably a triangular button 190 as shown in FIG. 6. By use of the button 187, the folders or file names may be arranged in alphabetic order, date order, modified date order, or by size. Clicking the button 187 brings up a pull-down window offering these selections. When an organizational parameter is selected, the folder or file names change position accordingly. In either the upper or lower portion, if the information does not fit in the available field, an arrow 200 will appear to indicate that additional information is available for viewing. In FIG. 4 there is such an arrow next to the path name. A button 210 labeled "D/S" is available at the top of the top portion for displaying the additional information. The "D" stands for double window size and the "S" stands for single window size. Selecting the button expands the upper and/or lower portion to double its size to present the additional information. This will cause the first section to temporarily overlap one of the other sections. Clicking the D/S button 210 again reverts the section to its original (single width) size. If the D button is selected in more than one of the four sections, the last section selected appears on top with the other sections underneath.

Referring again to FIG. 4, a multi-select (MS) button 220 allows the user to make multiple selections before executing the application launch and file load process. For example, if a user wants to open more than one WORD® file, the user would click on the MS button 220, click on each of the desired file names, and then click on the MS button again. With this last click on the MS button the file selector program launches WORD® and loads each of the files selected by the user. The last file selected appears on the display in WORD® with the other files available through menu selections in WORD®.

In one embodiment, a user can use the MS button 220 to simultaneously open files in several different applications, as further described below in reference to FIG. 10. To use the MS button, the user first clicks on the MS button 220, then selects any file names from any of the four windows, and then clicks the MS button again. This will cause all four applications to launch and all of the selected file names to be loaded, with the last one selected appearing on top.

As mentioned above, selecting the O/L button 145 toggles the lower region 110 from files to folders. To differentiate folders from files, the folders appear in a different color than file names. A user can sort through folders in a manner similar to that described above with respect to files. Folders can be sorted according to last modified date, alphabetic order, size, creation date, or other parameters. This allows the user to find data in a particular folder, for example data that may be arranged according to project names.

In one embodiment, selecting (e.g. by double-clicking a mouse) a folder causes a list of the filenames and subfolders in the folder to be displayed. Preferably, filenames and subfolders are indented to indicate that the name corresponds to an items contained within a folder. A path window in the upper region shows the path to a particular file or folder. Double-clicking the folder again collapses the folder. While the use of a double-click is preferred, other selection techniques are possible.

In one embodiment, if the user clicks on a particular folder, all of the file names within that folder will be loaded into their respective associated applications. Alternatively, a button may be provided to cause all files in a folder to be loaded into applications. This avoids conflict with the above-described display of sub-folders and filenames. Where files in a particular folder are related to common subject matters, these features can enhance user efficiency by allowing a user to activate all of those related files with a single input. In one embodiment, clicking on a particular folder loads all files within the folder and all files within subfolders. A button or other input interface may be provided to allow the user to select a multi-level mode, where files within folders and subfolders are all loaded, and a single-level mode, where only files in the top (selected) level are loaded.

The files in the list could be of many different types, i.e., WORD®, EXCEL®, PUBLISHER®, etc. The files are sortable as previously described. By default the first file in the list will be highlighted with information about the file displayed above. The user can use the mouse to select other files and view information above or launch and load the application and file. The user can also use the multifunction button 220 to select multiple files and, press the multifunction (MS) button 220 again to launch applications and load the selected files. If the selected files relate to different applications (i.e., WORD®, EXCEL, etc.) the appropriate applications will be launched and the selected file loaded into the appropriate application.

Another button allows a user to designate whether files of only one application can be launched, or whether applications from more than one different application can be launched. Button 221 allows a user to toggle between an "ALL" setting and "ONE" setting. When the button is set to "ALL", programs from any application may be selected, launched, and loaded. When the button is set to "ONE", only programs for a selected application may be selected, launched, and loaded. In one embodiment, the button filters the filenames that are presented in the lists shown in FIGS. 4 and 6 so that only filenames that are associated with a selected application are shown. Alternatively, all file types may be presented and only files associated with the selected application being selectable when the button is set to "ONE."

A button 223 may also be provided to allow the user to select the application (if any) that is associated with a particular section of the user interface. In one embodiment, the button activates a pull-down menu 224 that allows a user to select from a list of applications. In one embodiment, this button may be toggled on and off to activate or deactivate filtering for application types. Alternatively, the filter selection may be handled by the ALL/ONE button as described above.

In a preferred embodiment, the filtering of file types (i.e. files associated with particular applications) is accomplished by reference to the filename extension. For example, a user could choose to select on ".doc" to find all files that have this extension. The drop-down menu may alternatively show the extension, the name of associated application, or both the extension and the application. Any of the four windows can be used to display folders and filenames with any type of extension.

In another embodiment, groups of extensions may be defined, and applications in a particular group then be presented. For example, a Word Processing group may be defined to include file extensions associated with word Processing programs such as WORD®, WORDPERFECT®, and other programs. In another embodiment, groups may be defined by software manufacturer. As desired, any other combination of filename extension could be included in a group. Groups may be defined in the software program. Alternatively, the program may allow a user to define his or her own group. For example, a user may choose to display only files associated with the programs the user uses on a regular basis.

Figure 16:
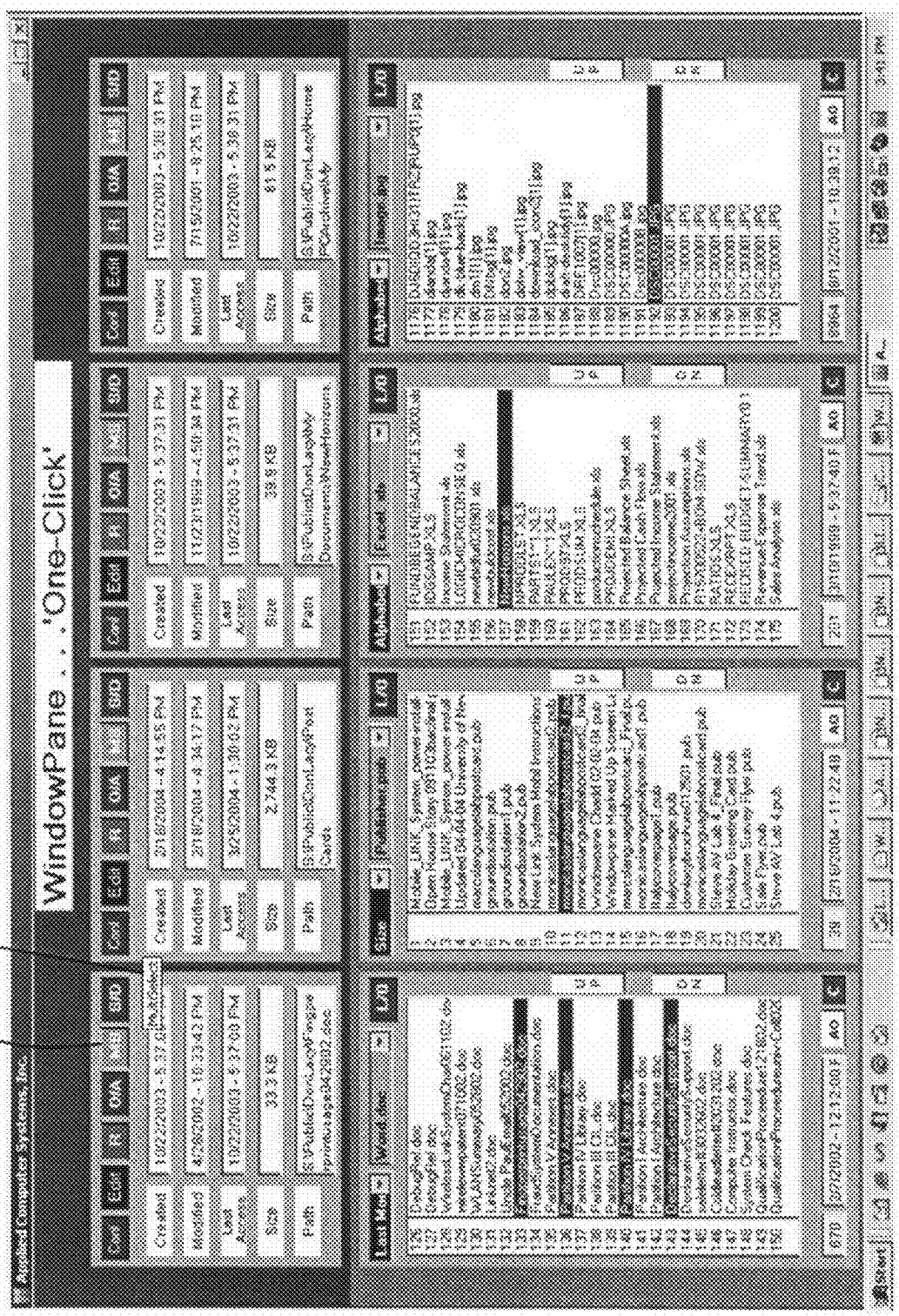
FIG. 16 shows a user interface with a message box near a multiselect (MS) button and multiple files being selected.
Figure 17:
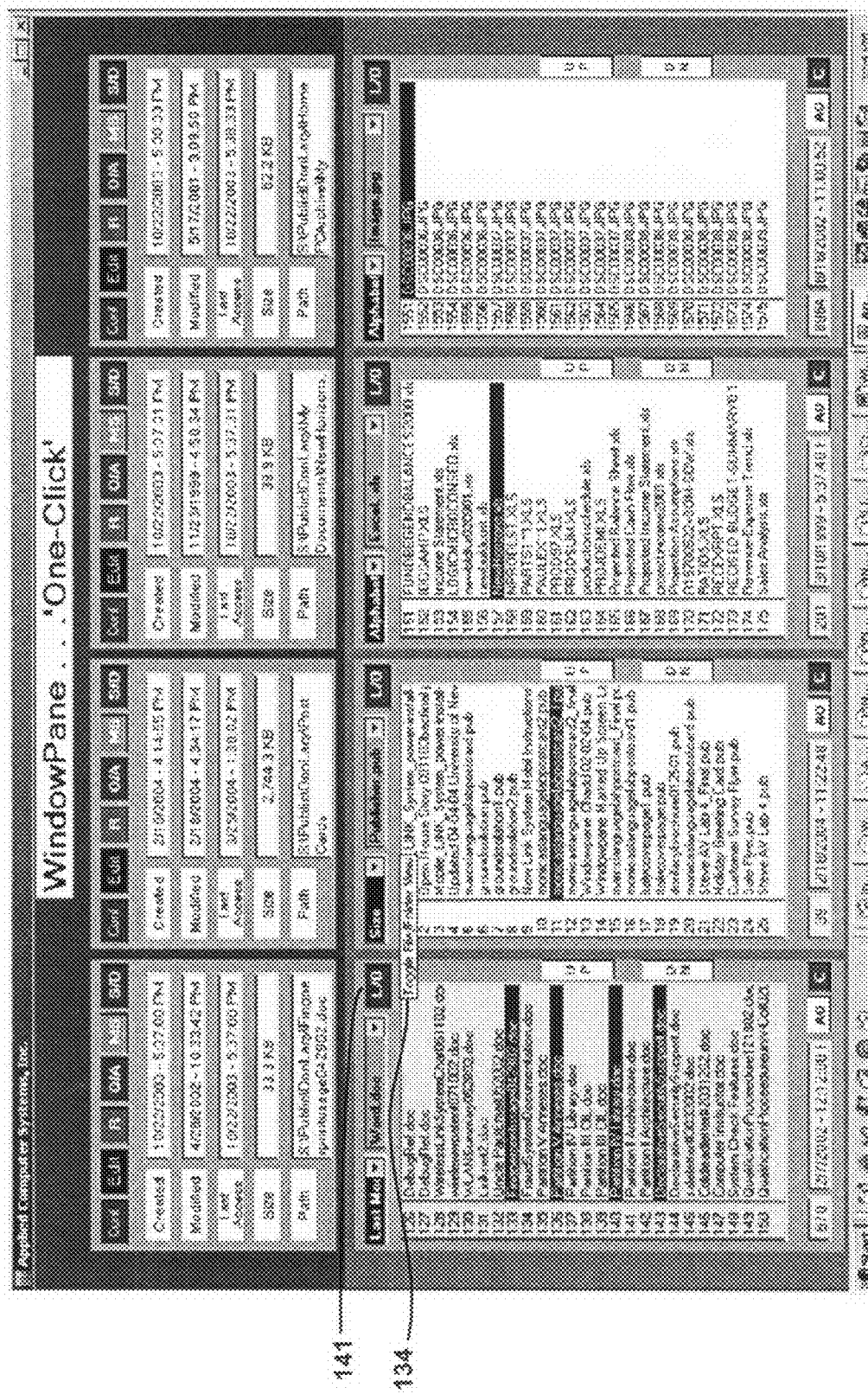
FIG. 17 shows a user interface with a message box near a Toggle File/Folder View (L/O) button.
Figure 19:
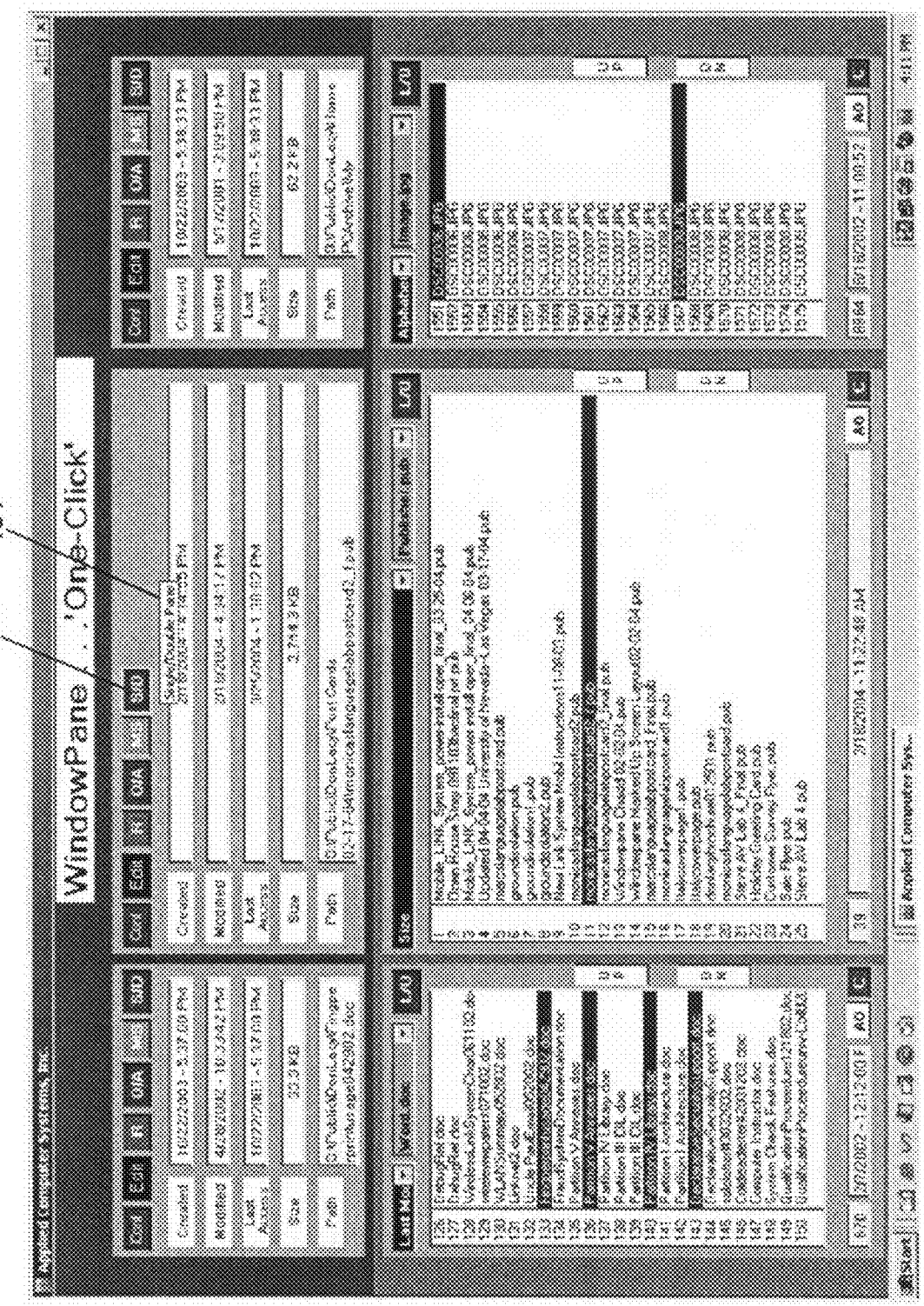
FIG. 19 shows a user interface with a pane in a double-width configuration.

Referring now to FIGS. 4 to 6, several different types of buttons 120, 121, 122, 123, 210, 220 are used. These include toggle, multiple, drop downs, user selectable, and up-down buttons. The buttons are preferably color-coded. For example, red buttons could represent a toggle function. This makes for easier identification by the user. Triangular buttons are used in corners to maximize use of screen space. These make effective use of space to allow information to be presented on the single screen compactly and efficiently. Text boxes 134 (shown in FIGS. 16, 18, 19) may be available over some or all buttons to describe the meaning of the button when the mouse pointer is placed over the button. A button may also be provided to allow the user to select colors for the window. The program also allows the user to customize the screen to enhance its use. For example the colors of the window frames around the eight sections of the user interface may be selected. The user may also select whether or not text boxes will appear to describe the various buttons. The user may also enter a custom title.

Figure 14:
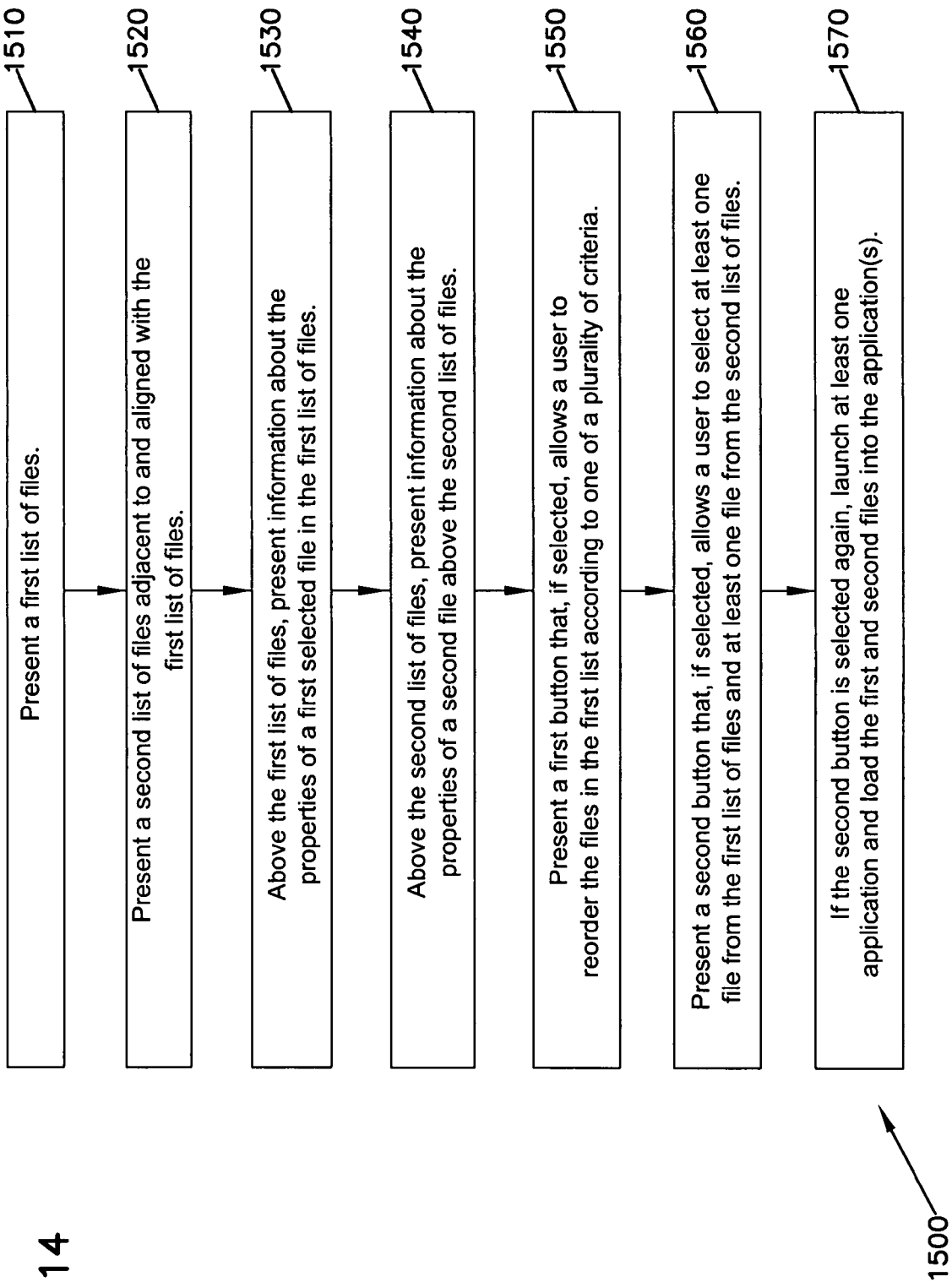
FIG. 14 is a flow chart for a program for displaying files.

FIG. 14 provides a flow chart for a program 1500 present a user interface such as the interfaces shown in FIGS. 4 and 7. Present files modules 1510, 1520 present first and second lists of files. The lists of files are preferably presented in a manner that is easily accessible to a user and are filtered or sorted so that the user sees the filenames in which the user is most likely to be interested. The first list is presented generally adjacent to and aligned with the second list. Present information modules 1530, 1540 present information about files in the list, such as metadata for a particular file. Information about files in the first and second lists is presented above the respective lists as shown in FIGS. 4 and 7. Reorder module 1550 allows a user to select a criterion for reordering the files in the list. For example, the default organizational criteria may be the date of last modification. The user may select a different criterion such as size or alpha-numeric order of filenames.

Select files module 1560 allows a user, when a button is selected, to select one or more files from the lists. Launch and load module 1570 is activated if the button is pressed again. Launch and load module 1570 launches applications that are related to the selected files and loads the selected files into the appropriate application.

Referring again to FIG. 8, on embodiment of the file selector program employs a database 20 to store information about files in the file system. In one embodiment, the database is populated when the file selector program is installed on a computer. Alternatively, the database may be populated later. The database may also be updated after it is populated to expand its scope or to include recently added files. In one embodiment, a button is provided to allow a user to initiate updating of the database. The database may also be updated automatically when the program initiates.

To populate the database, the user selects the desired function for the sections of the user interface. For example, the user may select WORD®, EXCEL, PUBLISHER, IMAGE, as shown in FIG. 4. The program then searches the computer for the appropriate data (i.e. files associated with these applications) and stores it in the database accordingly. Alternatively, search criteria may be preset by the program so that particular searches are conducted in accordance with preset criteria.

As the user selects different ways to display the information (by title, creation date, etc.), the program accesses the database 20 to retrieve the necessary information. In one embodiment, the data is initially sorted in all possible ways and the pre-sorted data is stored in the database to allow the information to be presented quickly to the user. Alternatively, the data can be sorted as requested by the user at the time of the request.

In the preferred embodiment, the database includes a searchable index of filenames and related parameters. It is preferred that the list appears to the user to be nearly immediately available for display. Depending on the hardware and software configuration and the number of files involved, searching the index to generate the 25 files in the list may be too time consuming to execute in real time. To avoid delays in displaying information, the program preferably uses combination of indexes and presorted arrays of data ("bins") to make information quickly available for presentation to the user. For example, in one embodiment, the program sorts the data to generate lists of the first 25 files that would appear for a variety of schemes and stores the data for later access. When a user requests display of files in a particular scheme, the program needs only to read and display from the storage bin, i.e. access the appropriate stored array of data and displays the list of files as requested, instead of conducting a database inquiry. Because this is accomplished without the need to search the database, delays may be substantially reduced. While this process has been described with reference to lists of 25 files, other embodiments exist. The program could use a larger or smaller predetermined number of files in the pre-sorted list, or could determine the number of files needed based on the configuration of the installation. For example, it may be desirable to generate longer lists for a system with a high-resolution display than for a low-resolution display because of the disparity in the number of filenames that can be displayed at one time. In addition, the array may include data for several screens worth of filenames, i.e. 100 filenames could be stored in the array instead of only 25 to accommodate four sets of 25 files.

In one embodiment, when a user selects an organizational scheme, the program presents the first set of filenames and then sorts the database in the background to generate an array of additional files for the list. For example, if a user selects alphabetical organization, the first 25 files are displayed, starting with files beginning with A, and the system generates the rest of the array while the first 25 files are displayed to the user. The array may include all of the files in the selected category, or only a subset (e.g. the first 100 files or the first 500 files.)

The use of bins (presorted arrays of data) can avoid lengthy delays in the presentation of information when user requests additional information (e.g. the next 25 files) or reorganization of information (e.g. to switch from alphabetical to chronological by last-modified date.)

In one embodiment, when a file is closed and saved in any application, the file selector program gathers information about the file and updates the database 20. The new data will then be available for viewing the next time the file selector program is activated. In another embodiment, the program periodically gathers updated information from the storage device(s) to update the database. In a preferred embodiment, a Refresh button 123 is presented on the interface. The program preferably operates in the background to maintain the database as the file systems change. However, this may not be possible if the program is not running when a change is made. In this case, pressing the Refresh button causes the program to update the database. In the preferred embodiment, the program automatically updates the database when it is started up. In addition, in one embodiment, the Refresh button may be used to update the database if a user has selected a new path to look for files or folders. Alternatively, the program may automatically update the database with information about files located at the new location after the user designates the new location.

Figure 9:
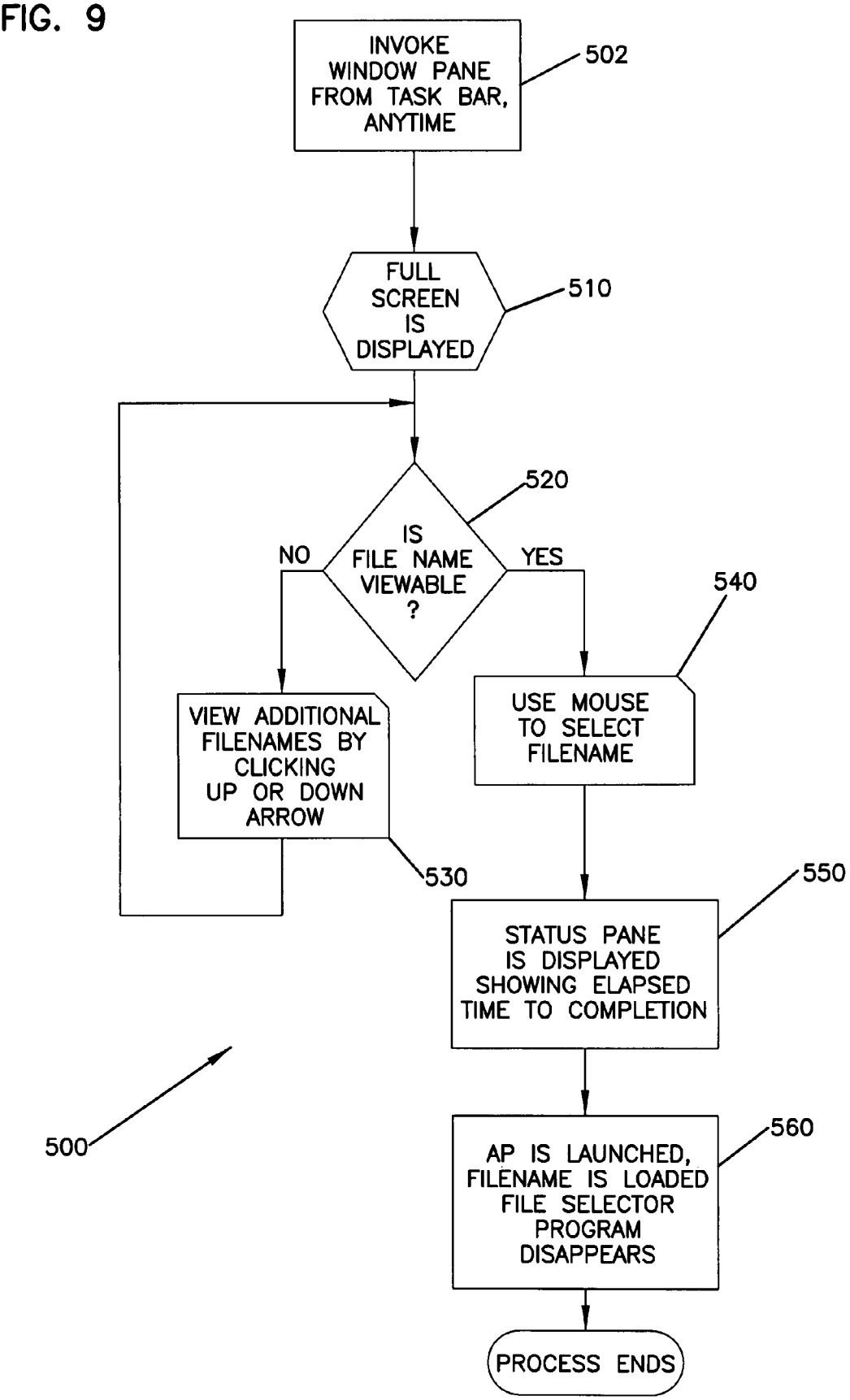
FIG. 9 is a flowchart for a file selector program.

Referring now to FIG. 9, the file selector program 500 is activated by activator module 502 from the task bar desktop icon or through other methods. User interface module 510 displays a user interface to a user. In filename viewable module 520, the user determines from the display on the user interface whether the desired file name is viewable. In a preferred embodiment, the information in the upper portion 90 changes as the user moves the mouse cursor over the file names so that the information displayed corresponds to the file name under the cursor. In an alternate embodiment, the information does not change until the user selects a file name.

Returning to filename viewable module 520, if the desired file name is not viewable, the view additional files module 530 allows the user to click on the up or down arrow to proceed through the list to find the desired file name. If the desired file name is viewable, the filename select module allows the user to user the mouse or keyboard to select a filename, which launches the application and opens the selected file. Status module 550 displays a status pane that shows the elapsed time to completion of the task, i.e., time to open the application and file name. Launch and load module 560 launches the application and loads the file corresponding to the file name. After that, the file selector program disappears.

In one embodiment, the information in the file selector program runs in the background even when the interface disappears. That way, when a user returns to the file selector program, the user can resume at the place the user left.

Figure 10:
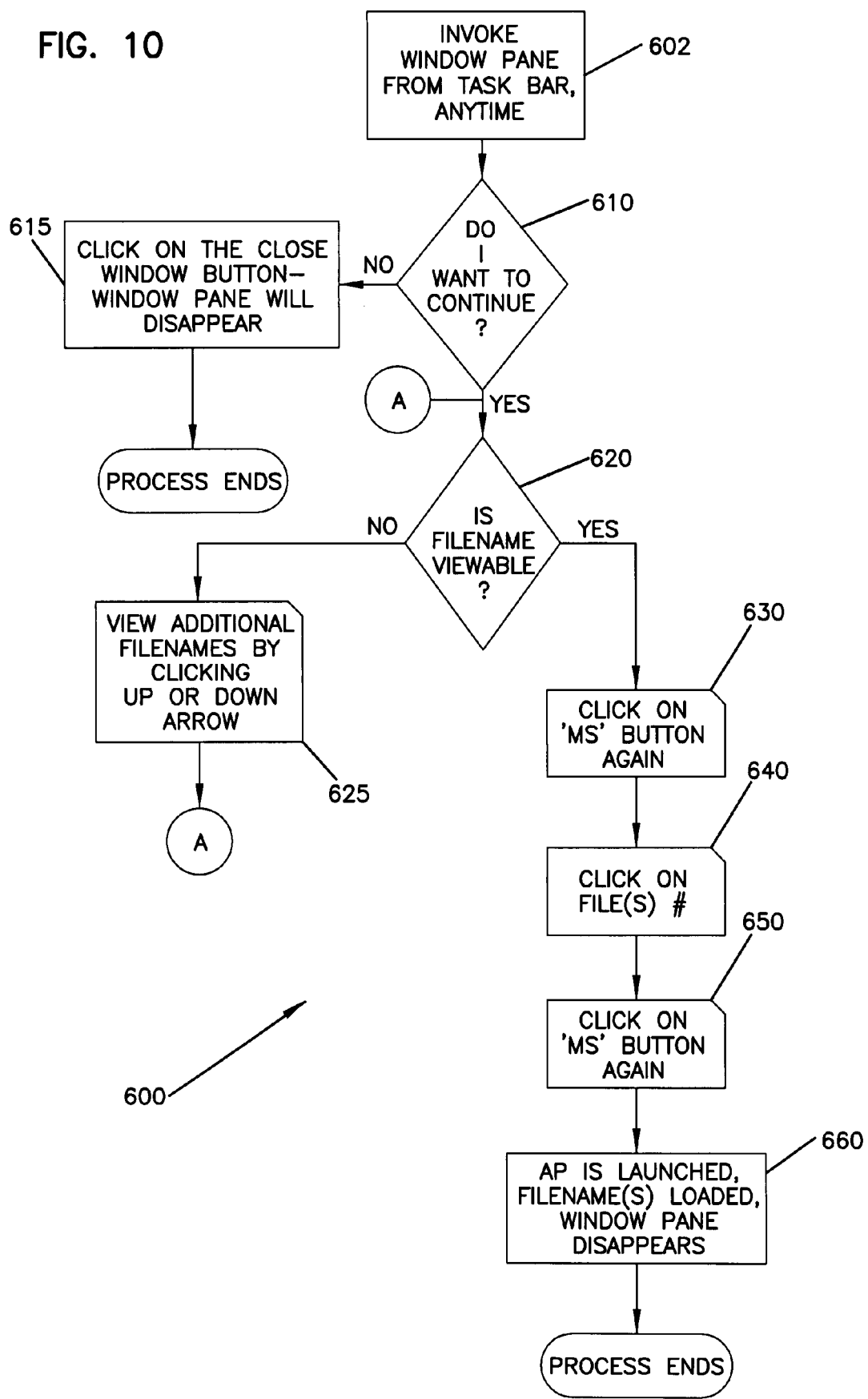
FIG. 10 is a flowchart for a program that selectively closes a file selector program or initiates a program for opening multiple files.

Referring now to FIG. 10, a flowchart illustrates a multi-function module 600 that may be activated by selecting the multifunction (MS) button 220. Activation module 602 activates the file selector program. Optional continue operation 610 queries the user whether he or she wants to continue with the file selector program. If the user indicates that he or she does not want to continue with the file selector program, close module 615 causes the file selector program to disappear when the user clicks a close window button 617 (shown in FIG. 4 and FIG. 15), and the process ends. If the user does wish to continue with the file selector program, filename viewable operation 620 asks the user whether the desired file name or names are viewable. If a desired file name is not viewable, the view additional files module 625 allows the user clicks the up and down arrows until it is viewable. Once the desired file name is viewable, the initiate multifunction module 630 allows the user to click the multifunction (MS) button to initiate the multifunction process 600. File select module 640 allows the user to select the desired files by clicking a mouse button or using a keyboard. Multifunction end module 650 allows the user to select the Multifunction (MS) button again after the desired files are selected. Launch and load module 660 launches the appropriate applications and loads the appropriate files. Launch and load module 660 may actually include two modules—a launch module and a load module. An optional disappear module causes the file selector program to disappear once the file(s) are loaded.

Figure 11:
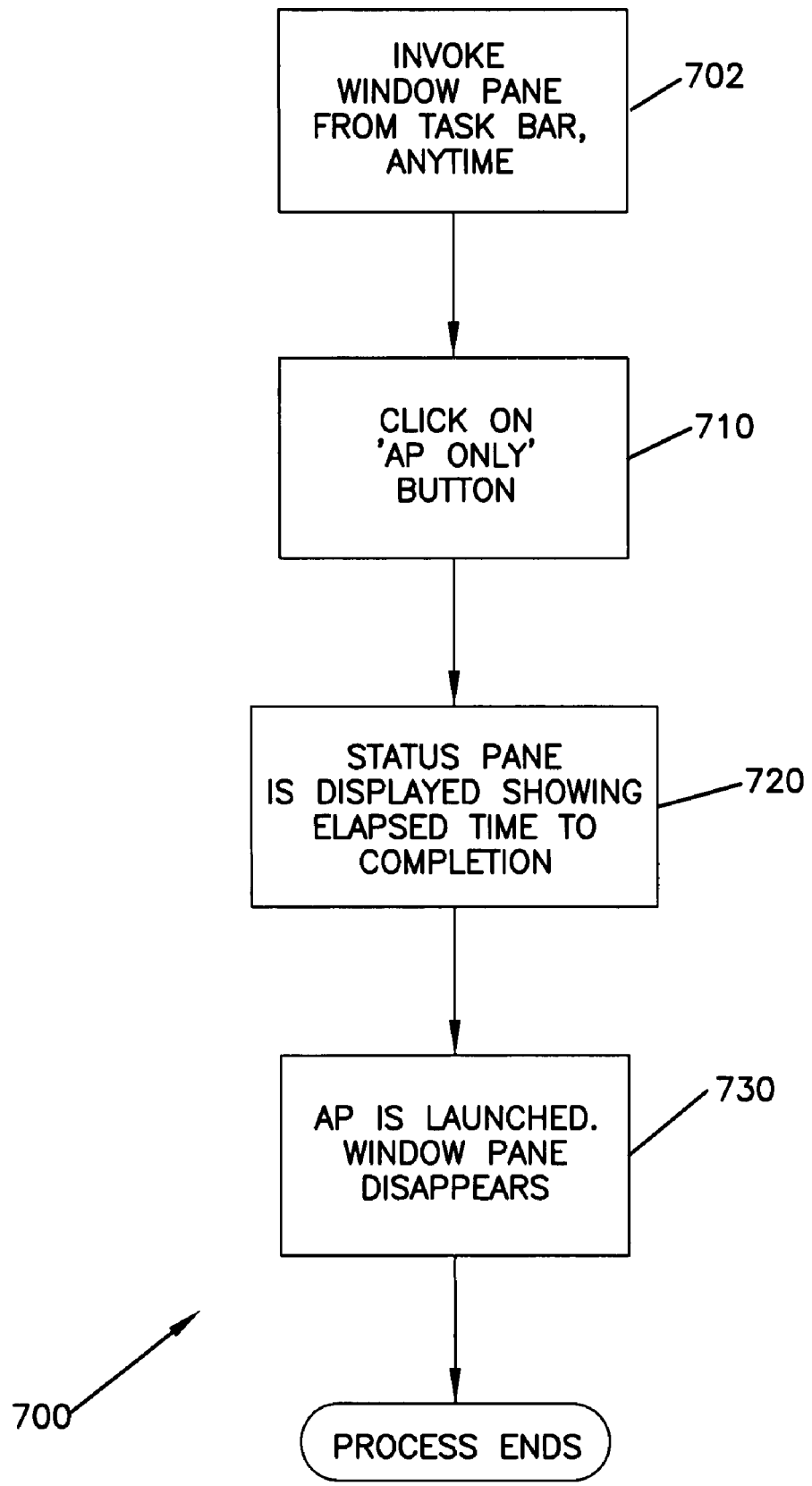
FIG. 11 is a flowchart for a program that opens an application only without opening a particular file.

Referring now to FIG. 11, a flowchart is shown for an open-application-only module 700. Activation module 702 activates the file selector program. Application-only module 710 receives a user input to launch an application without loading a file. Status pane module 720 displays the elapsed and/or remaining time to completion of the task, i.e., time left to initiate the application. Launch module 730 launches the application. When the application is launched, the file selector program disappears. While status pane module 720 is shown preceding launch module 730, status pane module 720 and launch module 730 may operate simultaneously or in the launch module may precede the status pane module. The same is true for status pane module 550 of FIG. 9.

Figure 12:
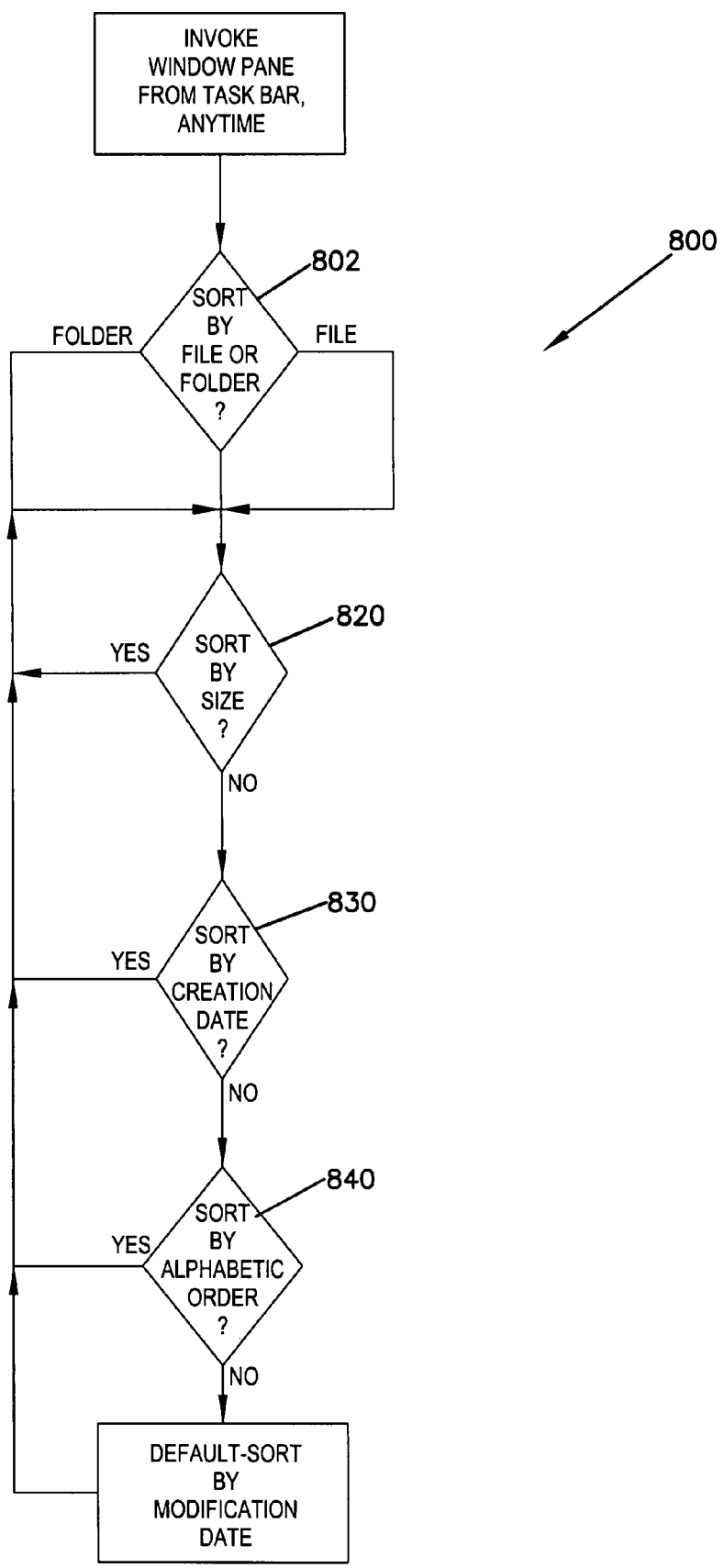
FIG. 12 is a diagram showing various parameters for organizing files.

Referring now to FIG. 12, a program for selecting an organizational scheme is illustrated. Activation module 802 activates the file selector program. Sort by file or folder operation 810 receives an input from the user to determine whether to sort by file or by folder. Regardless of whether the user is sorting by file or by folder, the data can be sorted by size, by creation date, or by alphabetic order. The default module 850 is to sort by modification date. Additional parameters for sorting data may also be used. Referring again to FIG. 12, sort by size operation 820 allows a user to select sorting by size, in which case filenames (or folder names) are presented in order according to size, either increasing from smallest to largest or decreasing from largest to smallest. Sort by creation date operation 830 allows a user to select sorting by creation date of the files, in which case the files may selectively be presented in chronological or reverse -chronological order. Sort by alphanumeric order operation 840 allows a user to select sorting by alphanumeric order or reverse alphanumeric order. At any point, a user may choose to return to sort by file or folder operation 810 to switch from files to folders or vice versa. The user may also return to one of the sorting operations 820, 830, 840 to resort the files or folder.

Figure 13:
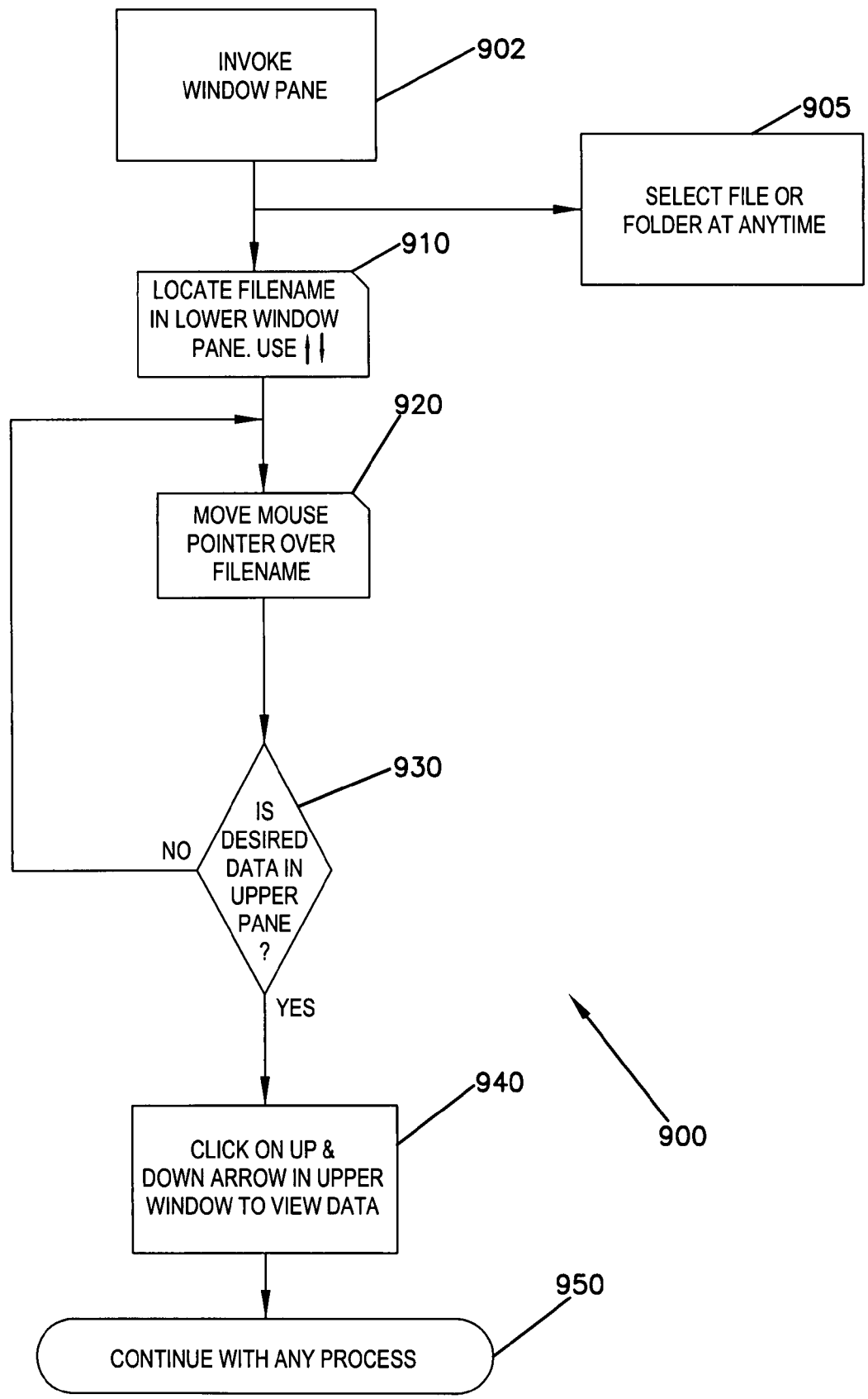
FIG. 13 is a flowchart for a program for displaying folder or file information in a user interface.

Referring now to FIG. 13, a flow chart is provided to illustrate the selection process 900 for selecting information to be displayed in the upper window. Activation module 902 activates the file selector program. Once the program is activated, a file or file folder may be selected at any time through file select module 905. File locate module 910 allows the user to employs up and down buttons 150 to locate the desired file name in the lower window. File select module 920 allows the user to select a file using the keyboard or by using a mouse or other input device to move the pointer over the file name for a selected file, which causes data for that file to appear in the upper window. In evaluate data operation 930 the user determines whether the desired data if viewable in the upper pane. If the desired data is not viewable, file locate module 910 again allows the user to use the up and down arrows to locate the desired file in the lower window. Returning to evaluate data operation 930, if the desired data is presented in the upper window, the view additional data module allows the user to use arrow keys 130, 132 in the upper window to view additional information about the selected file. Continue process module 950 then allows the user to continue with any process 950.

While this process has been described in part with respect to only to files, the same process applies when sorting through folders and accessing folder information. In the folders mode, files of varying types are displayed in the window, including types other than the four applications shown in FIG. 4. When a new file type is selected the launch and load process will begin to launch the appropriate application and load the file. In an alternative embodiment, the upper pane has several layers instead of the up and down arrows. The user can then select the top layer, the second layer or the third layer etc. to see information about a selected file or folder. One or more buttons may be provided in the upper window to indicate what layer of data is being displayed and to allow the user to toggle through the layers. The display may include as many layers as needed to display the desired information. The information available in the layers may include the filename, the size of the file, the type of file, the date modified, created, or accessed, attributes of the files status of the file, the owner of the file, the author of the file, the title, subject, and category assigned to the file, the number of pages in the file, comments, copyright, artist, album title, year, track number, genre, duration, bit rate, protected status, camera model, date picture taken, dimensions, company, description, file version, product name, or product version or other information.

When users create a new file, there is no need for the user to do anything to cause the information about that file to be saved in the database. The file selector program retrieves and saves that information automatically. While a user could optionally be prompted with a choice whether or not the information should be cataloged, such a prompt is not required.

The file selector program may be delivered on portable electronic media such as a CD or may be downloaded through the Web using an online purchasing system. Once the program is installed, a user may select what projects or application programs are to be included in the four sections of the user interface. The user then selects the directories where file names are to be found. This allows the file selector program to be applied to an entire drive, or a portion of the drive, or other configurations. This procedure may be repeated individually for each of the four sections of the user interface. This way, different root directories can be selected for different applications, if desired. Alternatively, the program may be configured to automatically generate a database for a local drive or other drives upon installation.

In the preferred embodiment, the user starts the program by selecting an icon on the task bar or desktop. On the first use after installation, in the preferred embodiment, the program shows no files in the four sections. A configuration interface allows the user to select one of the windows, select a file extension type (e.g. .doc or .xls), and select where to search for files and folders. The program then collects the appropriate information and populates the database, including the storage bins (arrays) for various organizational schemes. This procedure is repeated for each window. The configuration interface may for example use a menu design or a field design. The user may be permitted to browse a file structure to select the location of files to be searched for the database.

A button or combination of buttons (preferably a "Config" button 121 in the appropriate window) is provided to allow the user to change the configuration section of the interface, i.e. to select different file types or locations. Selection of the configuration button (or buttons) brings up the configuration interface to allow the user to input new data to reconfigure the selected section of the interface. In one embodiment, a user is permitted to narrow the configuration parameters of a section, e.g. to select a subfolder of the originally selected location or to impose additional limitations on the types of file types that are displayed. In this event, it may be desirable to purge extraneous data from the database rather than regenerate the database and bins. In one embodiment, the configuration interface includes a "none" option, in which the section returns to the inactive state that is presented when the program is started for the first time.

Preferably, the Config button 121 can also be used to change other parameters, including the frame colors, the name or title of the section, the file parameters that are displayed. In one embodiment, a user is presented with a question-and-answer interface where the user makes selections to choose characteristics of the appearance of the user interface.

In a preferred embodiment, to assign a window to a given extension, the user selects a down arrow, which causes the program to list all possible extensions that are available (i.e., .doc, pub, xls, jpeg). When the user selects an extension from the list, the program collects the appropriate files/folders from the designated directories (described later) and fills the lower window with the first (25) files. Depending on the hardware and software configuration, this process may takes a few seconds (3-30) depending on the number of files and directories the program has to search. This can be done independently for each of the (4) windows: after selecting the extension, the user can start the process of populating one of the other (4) windows.

In another embodiment, within the Config button, the user can designate the paths on the computer system where the program is to look for the chosen extension. The default path is C:\. If the user does not change the path field, then program will process all of the files/folders found on the C drive.

While the preferred embodiment shown in FIG. 4 shows the user interface divided into four sections corresponding to four different applications, more, or fewer, sections could be used. In addition, additional sections can be generated and stored and selectively displayed as the user desires. This allows creation of separate item lists for separate projects, especially where projects are already saved in particular file folders on a network.

Triangular buttons preferably include only one letter on the button. A drop down table may explain the meaning of the letter and allow the user to change the meaning or the letter. For example, in selecting blocks of 25 items, F could correspond to the First 25 items, X to the next 25 items, and P to the previous 25 items. The letters also correspond to keyboard shortcuts using Control or Shift key or another appropriate key in conjunction with a letter.

In one embodiment, when a folder is selected, only files of a certain file type are listed. For example, if one of the four item lists is selected to have WORD® documents, then when a folder is selected, only files associated with the WORD® application program would be displayed from the selected folder. Optionally, the user may be permitted to select that all file types be presented.

To close the program, an icon on the taskbar may be selected. Alternatively, a button 617 (shown in FIG. 4) may be provided on the user interface to close the program. The program may also close automatically as described above. The above specification, examples and data provide a complete description of the manufacture and use of the composition of the invention. Since many embodiments of the invention can be made without departing from the spirit and scope of the invention, the invention resides in the claims hereinafter appended.

I claim:

1. A method of displaying files to a user comprising:
    automatically maintaining a first list in a database such that the first list specifies files that are currently stored on a drive and that have a first filename extension;
    automatically maintaining a second list in the database such that the second list specifies files that are currently stored in the drive that have a second filename extension;
    presenting a user interface that simultaneously displays the first list and the second list;
    receiving launch input that indicates a file in the first list from the user via the user interface; and
    in response to the launch input, launching an application associated with the filename extension of the indicated file with an instruction to the application to load the indicated file receiving an organization input from the user selecting a reorganization of the files in the first according to an ordering criterion and, in response to the organization input, reorganization the files in the first list in accordance with the ordering criterion; and
    receiving a view-additional-file input from the user requesting to view additional files in one of the first list; and
    in response to the view-additional file input, presenting additional files in the first list as requested by the user.

2. The method of claim 1 further comprising:
    receiving a file-select input from the user selecting a file from one of the lists; and,
    in response to the file-select input, presenting information about properties of the file selected by the user in a property region of a section of the user interface associated with the list from which the user selected the file.

3. The method of claim 1 wherein the launch input comprises a single mouse input from a user.

4. The method of claim 1, wherein the first filename extension is associated with a first software application and the second filename extension is associated with a second software application.

5. A method of displaying files in a computer system comprising:
    automatically maintaining a first list in a database such that the first list specifies files that are currently stored on a drive and that have a first filename extension;
    automatically maintaining a second list in the database such that the second list specifies files that are currently stored in the drive that have a second filename extension;
    presenting a user interface that is divided into at least a first section and a second section,
        wherein the first section comprises;
            a list region that presents at least a portion of the first list arranged according to a first ordering criterion; and
            a property region for presenting information regarding properties of a file in the first list;
        wherein the second section comprises:
            a list region that presents at least a portion of the second list arranged according to a second ordering criterion; and
            a property region for presenting information regarding properties of a file in the second list;
    receiving a file-select input from a user selecting a file from one of the lists;
    in response to the file-select input, presenting information about properties of the file selected by the user in the property region of the section that includes the list from which the file was selected;
    receiving a launch-and-load input from a user selecting a file presented in one of the lists for loading, the launch-and-load input consisting of a single mouse input from the user; and,
    in response to the launch-and-load input:
        launching an application that is associated with the filename extension of the selected file;
        loading the selected file in the application; and
        hiding the user interface.

6. The method of claim 5 further comprising, after hiding the user interface, presenting the user interface again with the lists presenting the same files in the same organization as before the user interface was hidden, whereby a user can resume working where he or she left off.

7. The method of claim 5 wherein the first filename extension is associated with a word processing application and the second filename extension is associated with a spreadsheet application.

8. The method of claim 5 further comprising:
providing a multi-select button on the user interface that initiates a multi-select mode;
if the multi-select button is activated by the user, receiving an input from the user selecting a first file from the list in the first section; and receiving an input from the user selecting a second file from the list in the second section; and
if the multi-select button is activated again by the user, loading the first file into a first application that is associated with the first filename extension and loading the second file into a second application that is associated with the second filename extension.

9. The method of claim 8,
wherein the first application is different than the second application;
wherein the first application and the second application launch without additional input from the user; and
wherein the first application loads the first file and the second application loads the second file without additional input from the user.

10. The method of claim 5 wherein the step of presenting information about properties of the file selected by the user comprises presenting the file size, the date the file was last accessed, the date the file was created, the date the file was last modified and the path to the file on the network.

11. The method of claim 10, wherein presenting the user interface further comprises presenting a button that if selected doubles the amount of lateral screen space available to present information about the properties of the file selected by the user so that additional information can be presented as necessary.

12. The method of claim 5 further comprising providing a button that if selected launches an application without loading a data file.

13. The method of claim 5 wherein the launch and load launch-and-load input consists of a single click of a button on a mouse.

14. The method of claim 5 wherein the files in the first list and the second list are selectively ordered according to at least one of the following organizational schemes:
by alphabetical order of the names of the files or reverse alphabetical order;
by chronological or reverse-chronological order based on the creation date of the files;
by chronological or reverse-chronological order based on the date the files were last modified; and
by size.

15. The method of claim 14 further comprising providing a triangular shaped button in a corner portion of the list region of the first section, wherein selecting the triangular shaped button brings up a menu that allows the user to selectively order the items in the first list by one of a plurality of organizational criteria selected from a group consisting: alphabetical order, creation date, last modified date, and size.

16. The method of claim 5 wherein the file-select input and the launch-and-load input each consists of clicking a button on an input device.

17. The method of claim 5 wherein the list region of the first section presents both files and folders, the files and folders being sortable according to ordering criteria.

18. The method of claim 5 further comprising receiving an input requesting to print, cut, copy, delete, or rename a file and, in response to the input, printing, cutting, copying, deleting, or renaming the file as requested.

19. The method of claim 5, wherein the first filename extension is associated with a first software application and the second filename extension is associated with a second software application.

20. A computer readable medium comprising instructions that, when executed by a device, cause the device to:
automatically maintain a first list in a database such that the first list specifies files that are currently stored on a drive and that have a first filename extension
automatically maintain a second list in the database such that the second list specifies files that are currently stored in the drive that have a second filename extension;
present a user interface that simultaneously displays the first list and the second list;
receive launch input that indicates a file in the first list or the second list from the user via the user interface; and
in response to the launch input, launch an application associated with the filename extension of the indicated file with an instruction to the application to load the file
receive a file-select input from the user selecting a file from one of the lists;
in response to the file-select input, present information about properties of the file selected by the user in a property region of a section of the user interface associated with the list from which the user selected the file;
receive an organization input from the user selecting a reorganization of the files in the first list according to an ordering criteria and, in response to the organization input, reorganize the files in the first list; and
receive a view-additional-file input from the user requesting to view additional files in first list; and
in response to the view-additional-file input, present additional files in the first list as requested by the user.

21. The computer readable medium of claim 20, wherein the launch input comprises a single mouse input from the user.

22. The computer readable medium of claim 20, wherein the first filename extension is associated with a first software application and the second filename extension is associated with a second software application.

* * * * *